United States Patent [19]

Tsujino et al.

[11] Patent Number: 4,792,743
[45] Date of Patent: Dec. 20, 1988

[54] CHARGING DEVICE

[75] Inventors: Kazuhiro Tsujino, Matsubara; Seiji Koyabu, Nara, both of Japan

[73] Assignee: Sanyo Electric Co., Ltd., Osaka, Japan

[21] Appl. No.: 930,490

[22] Filed: Nov. 14, 1986

[30] Foreign Application Priority Data

| Nov. 15, 1985 | [JP] | Japan | 60-176417[U] |
| Nov. 15, 1985 | [JP] | Japan | 60-176429[U] |
| Jun. 11, 1986 | [JP] | Japan | 61-135423 |
| Jul. 15, 1986 | [JP] | Japan | 61-108163[U] |
| Jul. 16, 1986 | [JP] | Japan | 61-167057 |

[51] Int. Cl.$^4$ ............................................. H02J 7/04
[52] U.S. Cl. ..................................... 320/15; 320/22; 320/31; 320/39
[58] Field of Search ........................ 320/13, 14, 15–17, 320/22–24, 39, 40

[56] References Cited

U.S. PATENT DOCUMENTS

| 4,061,956 | 12/1977 | Brown et al. | 320/23 X |
| 4,291,266 | 9/1981 | Portmann | 323/906 X |
| 4,313,078 | 1/1982 | Bilsky et al. | 320/15 |
| 4,387,332 | 6/1983 | Oyamada et al. | 320/15 |
| 4,583,035 | 4/1986 | Sloan | 320/22 |

*Primary Examiner*—R. J. Hickey
*Attorney, Agent, or Firm*—Armstrong, Nikaido, Marmelstein & Kubovcik

[57] ABSTRACT

A battery charging device including a series transistor inserted between a source circuit and a battery, and a comparison circuit which compares the voltage at the terminal of the battery and the voltage of an output of the source circuit so as to turn off the series transistor when the terminal voltage is higher than the output voltage, whereby, when the terminal voltage of the battery becomes higher than the output voltage of the source circuit at the time of an interruption of supply of power, the series transistor is brought into the off-state to prevent the battery from being discharged. The charging device further includes circuits for connecting a plurality of batteries successively to the source circuit for charging, switching control circuit means for operating said connecting circuits sequentially upon detection of a battery fully-charged state or short-circuited battery condition, and timing circuits for controlling the time of connection of short-circuit detection circuits and for temporarily prohibiting operation of the switching control circuit so that each of a total short-circuited condition, a partial short-circuited condition, and an over-discharged condition of a battery can be identified and the switching control circuit can be caused to appropriately operate or not operate in response to each condition.

13 Claims, 14 Drawing Sheets

| Fig. 9(a) | Fig. 9(b) |
| --- | --- |
| Fig. 9(c) | Fig. 9(d) |

CHARGING DEVICE

BACKGROUND OF THE INVENTION

The present invention relates to a charging device for charging such a battery, by an output generated from a constant current source, as is suitable for use in an AC power adapter used as a power supplying device in an electronic apparatus such as a portable video tape recorder.

Hitherto, in order to charge a plurality of batteries (for example, an NiCd battery or cell), this plurality of batteries (including a battery pack which contains many NiCd batteries) have been charged successively one after another, and separately from each other in one way. In this case, a so-called full-charge detection circuit is required because, when one battery which is being charged is found to be already fully charged, then the charging of this battery should be stopped so that a next battery is started to be charged. Japanese Patent Publication Tokkosho No. 60-18177 discloses one example of the full-charge detection circuit referred to above. The prior art device disclosed in Tokkosho No. 60-18177 is, with noting the fact that the charging voltage characteristic is gradually dropped after passing its peak point, so constructed as to decide that the battery is fully charged through detection of the voltage drop by a predetermined amount ($\Delta v$) compared with the voltage at the peak point.

Moreover, in another prior art device disclosed in Japanese Patent Laid-Open Publication (unexamined) Tokkaisho No. 56-110446, a charging device is so designed that a plurality of NiCd batteries are separated into blocks. Every time one battery block is detected to be fully charged, another battery block is started for the charging. Or when a short-circuited battery is connected, this is detected, and a next battery block is started to be charged. The detected of the short-circuited battery is conducted in the manner that while the charging voltage of the battery is compared at all times with a predetermined reference voltage, and when it is found to be lower than the reference voltage, the battery is determined to be short-circuited. However, the prior art has such a drawback that when the battery is an over-discharged battery, the battery might be erroneously determined to be short-circuited.

In the case where a fully-charged battery which is already in a fully-charged condition is re-charged, with employing the prior art fully-charge detection circuit described above, the charging characteristic shows its peak one minute after the start of the charging, and it falls down linearly thereafter. The voltage drop by $\Delta v$ is detected in the middle of the linear falling of the charging characteristic, leading to the stop of the charging. On the other hand, the charging characteristic of the over-discharged battery is such that after passing its peak, it once drops to reach a steady state.

Therefore, in the process to reach the steady state, the voltage drop of $\Delta v$ is detected, which might be erroneously determined as that the battery is fully charged, resulting in an undesired stoppage of the charging. With consideration into the above-described fact, it is necessary to extend the time period during which the $\Delta v$ voltage drop is prohibited from being detected before the charging characteristic reaches the steady state (e.g., for 5 minutes after the start of the charging). However, if the prohibition time is extended, the full-charge detection of a fully-charged battery when it is re-charged is delayed, and consequently the battery is over-charged from an increased period of time, resulting in an inferior charging.

In the meantime, when a plurality of NiCd batteries are connected in series to an individual battery, that is, a battery pack is employed, and if some of the NiCd batteries are short-circuited, namely, the battery pack is partially short-circuited, such as phenomenon that the charging voltage exceeds the reference voltage which is set to detect when the battery is completely short-circuited, and accordingly it becomes impossible to detect that the battery pack is partially short-circuited.

SUMMARY OF THE INVENTION

An essential object of the present invention is to provide an improved charging device which is provided with an abnormal-charging detection circuit for detecting an abnormal condition of the charging of a battery, a full-charge detection circuit for detecting that the battery is fully charged, and a display means which distinguishes and displays whether the battery is abnormally charged or the battery is fully charged, so that it can be determined whether the stoppage of the charging is caused by an abnormal charging or by a fully charged condition of the battery.

In accomplishing the above object, according to the present invention, the charging device includes a first short-circuit detection circuit which compares the charging voltage at a relatively short period of time after the start of the charging with a first reference voltage which is set lower than the charging voltage, a second short-circuit detection circuit which compares a given time later from the detection of the first short-circuit detection circuit the charging voltage with a second reference voltage which is set to be higher than the first reference voltage. When either one of the first and the second short-circuit detection circuits detects the short-circuit, the charging can be interrupted. By the employment of the first short-circuit detection circuit, a short-circuited charging terminal and a completely short-circuited battery in the battery pack can be distinguished from a normal battery (including an over-discharge battery). Moreover, owing to the presence of the second short-circuit detection circuit in the charging device of the present invention, a partially short-circuited battery can be distinguished in the battery pack.

A second object of the present invention is to provide an improved charging device of the type referred to above which is so arranged as to delay the start of the detection whether the battery is fully charged in order to distinguish an over-discharged battery by the voltage at the initial stage of the charging immediately after the start of the charging, and setting the time period of the delay sufficiently long during which the detection whether the battery is $\Delta v$ fully-charged is prohibited.

According to the charging device of the present invention, even when the battery is in an over-discharged condition, an erroneous detection caused by a large voltage drop immediately after the start of the charging can be prevented.

A third object of the present invention is to provide an improved charging device of the type referred to above wherein the detection by a short-circuit detection circuit is delayed until the terminal voltage of a battery reaches a steady state, so that the detection whether the battery is short-circuited is carried out in the steady state of the charging voltage characteristic, thereby to avoid an erroneous detection.

A fourth object of the present invention is to provide an improved charging device of the type referred to above which charges a battery by an output current from a source circuit, and which includes a series transistor inserted between said source circuit and the battery, and a comparison circuit which compares the voltage at the terminal of the battery and the voltage of an output of the source circuit so as to turn off the series transistor when the terminal voltage is higher than the output voltage. According to the charging device, when the terminal voltage of the battery becomes higher than the output voltage of the source circuit at the time of an interruption of supply of power, the series transistor is brought into the off-state, thereby to prevent the battery from being discharged.

A fifth object of the present invention is to provide an improved charging device of the type referred to above which charges a plurality of batteries by successively switching the batteries one after another with the use of a switching control circuit, while detecting whether each battery is fully charged.

In accomplishing the above-described object, the charging device is provided with a switching means connected to an output of a source circuit so as to be turned on when the plurality of batteries are connected to the charging device, a rising voltage detection circuit which detects the rising of an output voltage of the switching means, and a signal formation circuit for forming an initially-set signal on the basis of the output of the rising voltage detection circuit. Accordingly, the switching control circuit is set at an initial state by the initially-set signal. So long as the output voltage is generated by the source circuit, the switching means remains turned on through connection of the battery, to form the initially-set signal. Also, when the battery is reconnected after it is once disconnected, the initially-set signal is formed. In addition, even when an interruption of supply of power is caused during the charging of the battery, the initially-set signal is formed when the supply of power is returned, and thus the charging can be started again.

A sixth object of the present invention is to provide an improved charging device of the type referred to above which charges a plurality of batteries by successively switching the batteries one after another with the use of a switching control circuit by an output from a constant current source. The charging device is comprised of a series transistor inserted in a source line connecting the constant current source and the plurality of batteries, a control transistor for controlling the condition of the series transistor, and a Zener diode connected to the base of the control transistor and to the side of the constant current source of the source line. Furthermore, in the charging device of the present invention, there are included a source control circuit which maintains the source voltage of the switching control circuit and a short-circuit detection circuit which detects the condition of the short-circuit of a connection terminal of each of the batteries so as to form a switching signal for changing the condition of the switching control circuit. When the connection terminal of the battery is short-circuited, both the series transistor and the control transistor are brought into the off-state, in the charging device of the present invention having the above-described construction. Therefore an output of the constant current source is never reduced, and the switching control circuit, etc. are accordingly operable. Thus, the charging device of the present invention is advantageous in detection of a battery in a short-circuit condition, thereby to automatically start the charging of a next battery.

A seventh object of the present invention is to provide an improved charging device of the type referred to above wherein a source circuit and a battery which has generally the same configuration as the source circuit are connected at a predetermined position so as to charge the battery. The charging device is provided with a series transistor inserted between the source circuit and the battery and, a battery/source circuit detection circuit which turns on the series transistor only when the source circuit is connected at the predetermined position. In the above construction, when the battery is erroneously connected instead of an AC pack (source circuit), the series transistor is turned off, and accordingly the charging device can be prevented from being destroyed.

BRIEF DESCRIPTION OF THE DRAWINGS

These and other objects and features of the present invention will become apparent from the following description taken in conjunction with preferred embodiments thereof with reference to the accompanying drawings, in which.

DESCRIPTION OF THE PREFERRED EMBODIMENTS

Figure 1C:
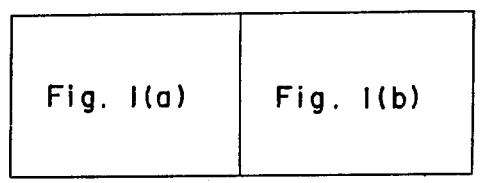
FIGS. 1(a), 1(b) and 1(c) represent a block diagram showing a circuit of a charging device according to a first embodiment of the present invention.

Before the description of the present invention proceeds, it is to be noted that like parts are designated by like reference numerals throughout the accompanying drawings.

Figure 1A:
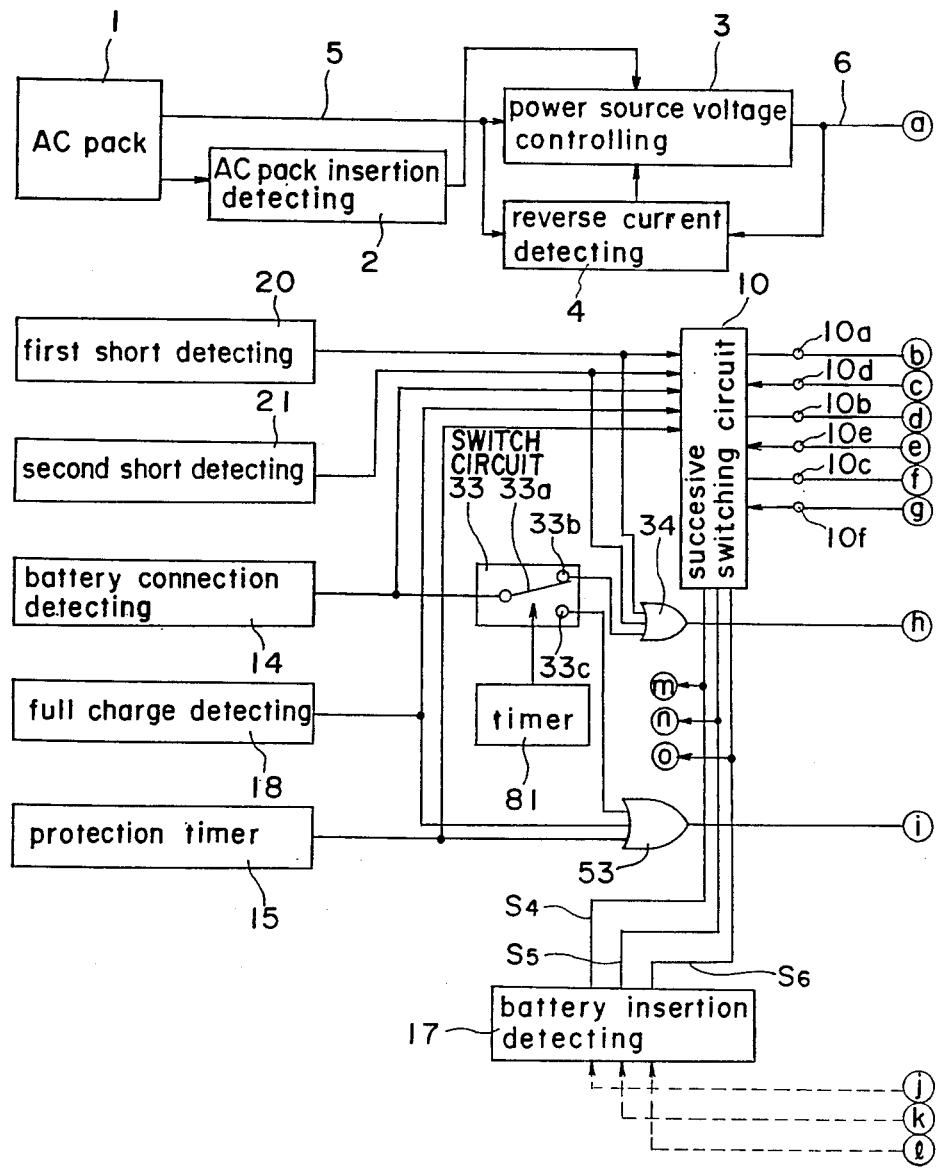
Figure 1B:
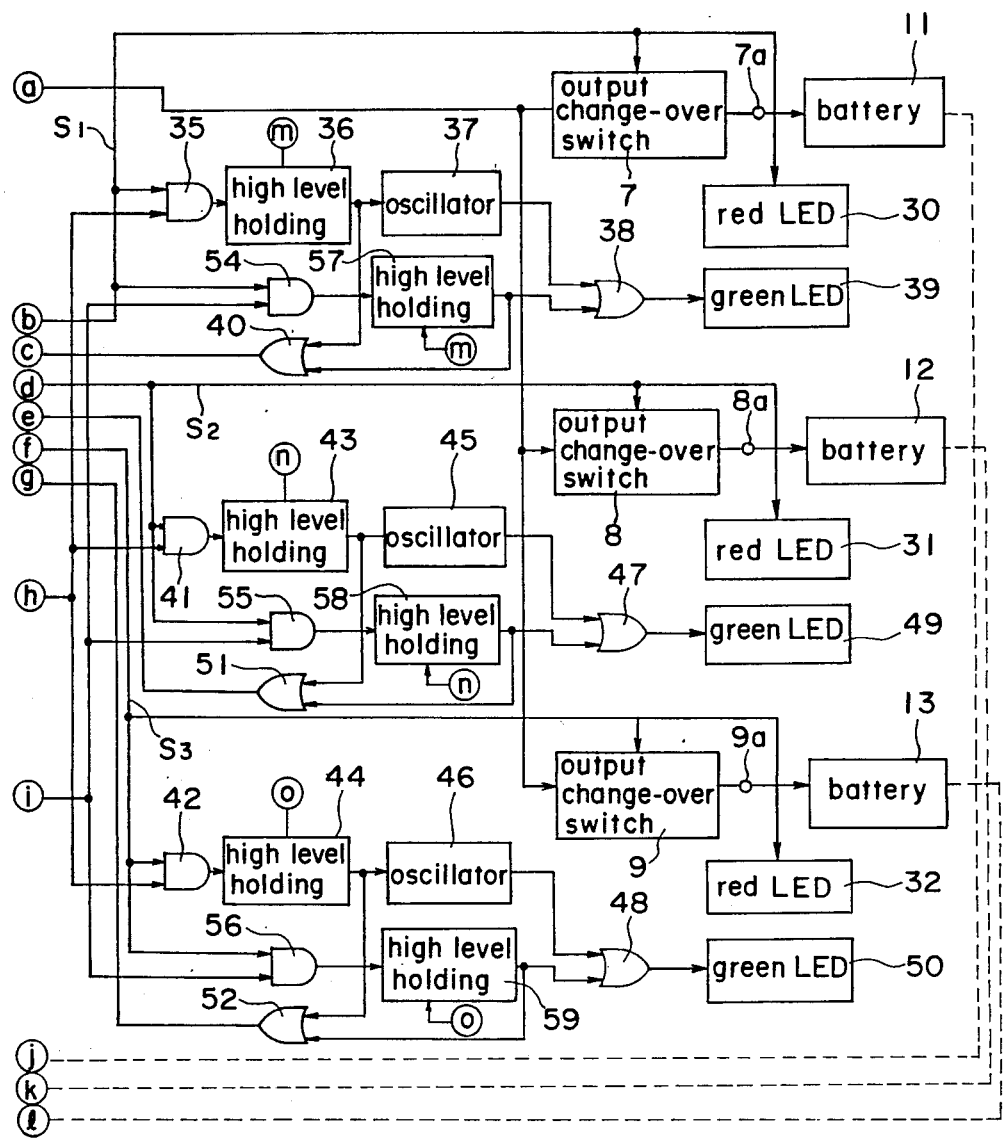
Figure 2:
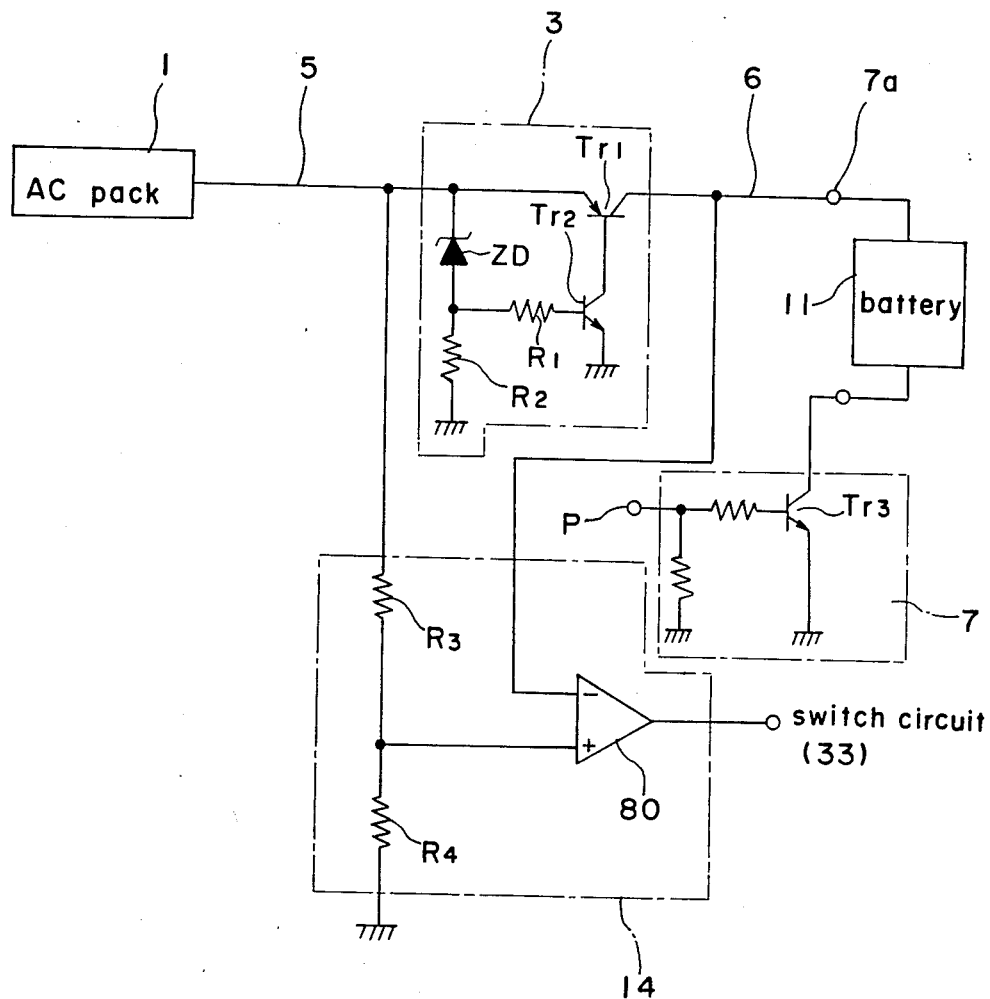
FIG. 2 is a circuit diagram of an essential part of FIG. 1.

Referring first to FIGS. 1 and 2, a first embodiment of the present invention will be described hereinbelow.

In FIGS. 1(a) and (b) there is shown a block diagram of a circuit of a charging device according to a first embodiment of the present invention. An AC pack (source circuit) 1 which is a driving source supplies an output of a constant current source. The AC pack is connected to an AC pack insertion detection circuit 2.

The AC pack 1 is of the same physical configuration as a battery, and is able to be used in an apparatus employing a battery while being contained in a battery connection part of the apparatus. Because of the same configuration, however, the AC pack and the battery may be erroneously connected to the charging device. Specifically, if a battery different from the constant current circuit is connected to the charging device at a position where the AC pack should be connected and, a terminal of the battery is short-circuited, it happens that the charging device is destroyed by a large amount of current. In order to prevent this destruction of the charging device, it is detected by the AC pack insertion detection circuit 2 whether the AC pack 1 is connected at the predetermined position.

A reverse current flow detection circuit 4 detects the presence of a reverse flow of current through comparison of the voltages between a source line 5 and a source line 6. When the voltage at the source line 5 is lowered by an interruption of supply of power, etc. during the charging of the battery, there is brought about a fear that the current might flow in a reverse direction from the source line 6 towards the source line 5. Therefore, the reverse flow detection circuit 4 is provided in the charging device.

In the case where it is detected by an output generated from the AC pack insertion detection circuit 2 or the reverse flow detection circuit 4 that the AC pack is not connected at the predetermined position, or the current flows in the reverse direction, respectively, the supply of the constant current source through the AC pack 1 to the battery is stopped by a source voltage controlling circuit 3.

Output charging switches 7, 8 and 9 are controlled to be sequentially opened or closed by control signals from a successive switching circuit 10 which will be described later. These switches 7, 8 and 9 are interposed respectively between the source line 6 and batteries 11, 12 and 13.

A battery connection detection circuit 14 detects whether or not the batteries 11, 12 and 13 are connected to respective terminals 7a, 8a and 9a.

A protection timer circuit 15 is reset by a control signal from the sequential switching circuit 10. For example, when a battery which is completely charged rapidly in 60 minutes is to be charged, the protective timer circuit 15 generates a timer output about 70 minutes after the start of the charging so that the battery can be prevented from being excessively charged after it is fully charged, which would otherwise be brought about by an erroneous operation.

A first short-circuit detection circuit 20 is provided so as to detect in a considerably short period of time after the start of the charging whether the charging voltage reaches a first reference level (the level of the charging voltage which the over-discharged battery can reach in the short period of time) to decide whether each of the batteries is completely in a short-circuited condition.

On the other hand, a second short-circuit detection circuit 21 is so arranged as to detect a predetermined period of time after the detection of the first detection circuit 20 whether the charging voltage reaches a second reference level and to decide whether each of the batteries is partially in a short-circuited condition. It is to be noted here that the battery is composed of five NiCd batteries, each 1.2V, and it is designated as a partially short-circuited condition when at least one of the five batteries is in the short-circuit condition. It is also be be noted that the second reference level is set to be such voltage value that cannot be attained when the battery is in a partially short-circuited condition.

Whether each of the batteries is inserted at the position corresponding to the respective terminal 7a, 8a and 9a is mechanically detected by a battery insertion detection switch 17.

When the voltage of an output from each of the terminals 7a, 8a and 9a is changed, namely, the charging voltage is dropped by $\Delta v$ from the voltage at a steady state, it is detected by a full-charge detection circuit 18 which then decides that the battery which is being charged comes to be fully charged.

The successive switching circuit 10 generates a control signal on the basis of an output from each of the battery connection detection circuit 14, the protective timer circuit 15, the first and the second short-circuit detection circuits 20 and 21, the battery insertion detection circuit 17 and the full-charge detection circuit 18. In other words, the battery connection detection circuit 14 selects a switch which should generate a control signal among the output changing switches 7, 8 and 9, and the battery which is being charged is completed, and then another battery which is recognized by the insertion detection switch 17 to be put in position is started to be charged. Furthermore, when the first and the second short-circuit detection circuits 20 and 21, and the battery connection detection $\Delta$ circuit 14 detect that a short-circuited battery is erroneously connected or a disconnected battery is erroneously connected to a terminal, the supply of power to such terminal is prevented.

A control signal S1 is generated to an output terminal 10a of the successive switching circuit 10. This control signal S1 not only controls the output changing switch 7 to be opened or closed, but also drives a red LED 30. Specifically, when the control signal S1 is in H level, the output changing switch 7 is turned on. Accordingly, the charging voltage in the source line 6 is supplied to the battery 11, and at the same time the red LED 30 is lit. As a result, an indication that charging is being conducted is displayed. Similarly, control signals S2 and S3 are generated to output terminals 10b and 10c of the successive switching circuit 10, controlling closing or opening of the output changing switches 8 and 9, respectively. Thus, the batteries 12 and 13 are permitted to be charged. Simultaneously, red LEDs 31 and 32 are lit to indicate that the charging is under way. It is to be noted that control signals S1, S2 and S3 are never generated simultaneously at one time.

Next, an indication member for distinguishing the fully-charged condition of the battery from the abnormally-charged condition thereof will be described below.

An output from the battery connection detection circuit 14 is, through a switching circuit 33, inputted, together with an output from each of the first and the second detection circuits 20 and 21, to an OR gate 34. Further, an output from the OR gate 34 is, together with the control signal S1, inputted to an AND gate 35 which in turn generates an output to be supplied to an oscillator 37 through an H level holder circuit 36. The oscillator 37 generates an output of a predetermined frequency which changes from high to low level or vice versa, every one second. This output from the oscillator 37 is inputted to a green LED 39 through an OR circuit 38. It is to be noted that the high level holder circuit 36 is arranged so as to maintain the output at the high level until the resetting is ordered once the input level is moved from low to high level.

Therefore, while the battery 11 is being charged, namely, when the control signal S1 is at the H level and the output changing switch 7 is turned to be on, with the red LED 30 being lit, the OR gate 34 generates an H level output if it is detected by the first short-circuit detection circuit 20 that the battery 11 is completely short-circuited, or it is detected by the second short-circuit detection circuit 21 that the battery 11 is partially short-circuited, or it is detected by the battery connection detection circuit 14 that the battery 11 is disconnected. Consequent to this, the high level holder circuit 36 holds the output at H level. While the H level of the output is maintained, the oscillator 37 is driven to turn on and off the green LED 39. At the same time, an output of the high level holder circuit 36 which is maintained at H level is, through an OR gate 40, inputted to an input terminal 10d of the successive switching circuit 10 so that the successive switching circuit 10 can detect that the battery 11 is in an abnormally-charged condition. Moreover, the control signal S1 is changed from H to L immediately when an abnormal charging is detected through an output from the battery connection detection circuit 14 or the first and the second short-circuit detection circuits 20 and 21, with the control signal S2 being moved from L to H, thereby to start the charging of the battery 12. It is to be noted here that the change of the level of the control signal from H to L is so arranged as to be carried out after the H level is latched by the high level holder circuit 36. When the control signal S1 is changed to be L level, the output changing switch 7 is turned to be off, and accordingly the charging of the battery 11 is stopped. At the same time, the red LED 30 is stopped being lit.

The same explanation as described above is applicable also to the batteries 12 and 13. An output from the OR gate 34 as well as each of the control signals S2 and S3 are inputted to AND gates 41 and 42 to be inputted to green LEDs 49 and 50 through high level holder circuits 43 and 44, oscillators 45 and 46 and OR gates 47 and 48, respectively. Accordingly, if the abnormal charging is given rise to, the batteries 12 and 13 are stopped being charged and at the same time, the red LEDs 31 and 32 are ceased to be lit. The green LEDs 49 and 50 are turned on and off. Moreover, an output from each of the high level holder circuits 43 and 44 is inputted to each of input terminals 10e and 10f of the successive switching circuit 10 through the respective OR gates 51 and 52, so that it can be detected whether the batteries 12 and 13 are in the abnormally-charged condition, and the green LEDs 49 and 50 are being turned on and off.

On the other hand, an output of the full-charge detection circuit 18 and an output of the protective timer circuit 15 are inputted, together with an output from the battery connection detection circuit 14 obtained through the switching circuit 33, to an OR gate 53 which in turn generates an output to be inputted, together with control signals S1, S2 and S3, to AND gates 54, 55 and 56 respectively. An output from the AND gate 54 is supplied to a green LED 39 through a high level holder circuit 57 and an OR gate 38.

Accordingly, while the battery 11 is being charged, with the control signal S1 being at H level, if it is detected by the full-charge detection circuit 18, the protective timer circuit 15 or the battery connection detection circuit 14 that the battery 11 reaches a fully-charged condition, the output of the OR gate 53 becomes H level and, the output of the AND gate 54 becomes H level. The high level holder circuit 57 maintains this condition of the H level of the outputs, lighting the green LED 39.

Simultaneously, upon receipt of outputs from the full-charge detection circuit 18, the protective timer circuit 15 and the battery connection detection circuit 14, the successive switching circuit 10 changes the control signal S1 from H to L and also the control signal S2 from L to H when the battery 11 is fully charged, thereby to start the charging of the battery 12. As a result of this, the red LED 30 is turned off.

Likewise, with respect to the batteries 12 and 13, an output from the OR gate 53 accompanied with control signals S2 and S3 is inputted to the AND gates 55 and 56, respectively. Then, an output from each of the AND gates 55 and 56 is, through respective high level holder circuits 58 and 59 and OR gates 47 and 48, sent to each of the green LEDs 49 and 50. Accordingly, when each of the batteries 12 and 13 is fully-charged, the respective green LEDs 49 and 50 are lit.

An output of each of the high level holder circuits 57, 58 and 59 is inputted to the respective input terminals 10d, 10e and 10f of the switching circuit 10 through the respective OR circuits 40, 51 and 52 in the same manner as an output of the high level holder circuits 36, 43 and 44, so that the successive switching circuit 10 can recognize which battery is a fully-charged battery. The successive switching circuit 10 always recognizes the batteries in the abnormally-charged condition or in the fully-charged condition upon receipt from outputs of the OR gates 40, 51 and 52, and accordingly the switching circuits 10 can designate another battery among the remaining batteries which are not recognized to be in the abnormally charged condition or in the fully-charged condition when the battery which is being charged comes to be abnormally charged or fully charged. For example, in the case where the battery 12 is recognized to be in the abnormally-charged condition and the green LED 49 is being turned on and off, after the battery 11 is charged to reach the fully-charged condition, the control signal S1 is changed from H to L, and at the same time, the control signal S3 is switched from L to H. Thus, the battery 13 is started to be charged. In this case, the control signal S2 is maintained at L level.

The high level holder circuits 36 and 57 are reset by turning an output S4 of the battery 11 to the battery insertion detection switch 17 (low active) to be at H level. In the same manner, the high level holder circuits 43 and 58 are reset by turning an output S5 of the battery 12 to the insertion detection switch 17 to at H level. Similarly, when the high level holder circuits 44 and 59 are to be reset, an output S6 from the battery 13 to the detection switch 17 should be turned to the H level. In other words, the battery which is once indicated to be fully-charged or abnormally-charged should be replaced with a fresh battery, or the power source for the charging device itself should be reset.

The battery connection detection circuit 14 will be described now with particular reference to the circuit diagram shown in FIG. 2.

A source voltage control circuit 3 is provided with a first transistor Tr1, a second transistor Tr2, a Zener diode ZD and resistances R1 and R2. The first transistor TR1 has a collector connected to a charging terminal 7a of the battery 11 for supplying charging current. The second transistor Tr2 has a collector connected to the base of the first transistor Tr1 so as to control the first transistor. On the other hand, the Zener diode ZD has an anode connected to a connection point of the resistances R1 and R2, and a cathode connected to the source line 5 of the AC pack 1. At an emitter of the first transistor Tr1, resistances R3 and R4 are connected in series to the earth. The connection point of the resistances R3 and R4 is connected to a plus terminal of a comparator 80. In addition, the first transistor Tr1 is connected at its collector to a minus terminal of the comparator 80. The control signal S1 from the successive switching circuit 10 is applied to a terminal p which is a base of a third transistor Tr3.

It is to be noted that the first transistor TR1 is connected at its collector also to the charging terminals of the batteries 12 and 13 (not shown in the drawing). It is also to be noted here that an output from the comparator 80 is supplied to the switch circuit 33 as an output of the battery connection detection circuit 14.

A timer circuit 81 has a set time of 2 seconds, and accordingly, everytime one of the control signals S1, S2 and S3 is generated, namely, every time the battery to be charged is switched from one to another, the timer circuit is reset. The switch circuit 33 is controlled by an output of the timer circuit 81. At the early stage of the charging, a movable contact 33a of the switch circuit 33 is switched to the side of a fixed contact 33b. When the timer circuit 81 generates an output, the movable contact 33a is moved to the side of a fixed contact 33c. Therefore, an output of the battery connection detection circuit 14 is inputted to the OR gate 34 only for 2 seconds immediately after another battery is switched to be charged. After the 2 seconds have passed, the output of the battery connection detection circuit 14 is inputted to the OR gate 53.

In explaining the operation of the battery connection detection circuit 14, while the battery 11 is being charged, the third transistor Tr3 is electrically conductive, with the first transistor Tr1 being supplied with the charging current. As a result, there is produced a potential difference of about 100 mV between the emitter and the collector of the first transistor Tr1. At this time, the input of the plus terminal of the comparator 80 is higher in level than the input of the minus terminal thereof, and accordingly the comparator 80 generates an H level output.

When the charging terminal is opened because of a disconnection or an inferior connection of the battery 11, and the potential difference between the emitter and the collector of the first transistor Tr1 is reduced to be approximately zero, the input at the plus terminal of the comparator 80 is applied with a voltage which is divided by the resistances R3 and R4 and accordingly the output of the comparator 80 becomes L level, which fact indicates the disconnection or the inferior connection in the battery 11.

In the meantime, if the charging is conducted at low temperatures by using a battery of a large capacity type, the charging voltage may sometimes be approximately close to the maximum output voltage Emax of the AC pack 1 immediately before the battery is fully charged. In such case as above, the potential difference between the emitter and the collector of the first transistor TR1 is decreased to bring the output of the comparator 80 to the L level although the battery is not abnormally charged. Therefore, in order to detect a disconnection or an inferior connection of the battery within two seconds after the charging is started, the output of the battery connection detection circuit 14 is inputted to the OR gate 34 only at the initial stage of the charging. After the two seconds have passed since the start of the charging, the switch circuit 33 is switched to the side of the fixed terminal 33b by the output generated from the timer circuit 81 so that the above-described erroneous detection that the battery is abnormally charged can be prevented, and the output of the battery connection detection circuit 14 is inputted to the OR gate 53 to be used for the detection of the fully-charged condition of the battery.

According to the first embodiment, the fixed terminal 33c of the switch circuit 33 is connected to the input of the OR gate 53. It is needless to say, however, that it may be detected only by the output of the full-charge detection circuit 18 or the protective timer circuit 15 when the battery is fully charged, without the connection between the switch circuit 33 and the OR gate 53.

As is clear from the foregoing description, in the charging device of the first embodiment of the present invention, it is advantageously effective in clear distinction and indication of batteries of various types including one of a large capacity type as to whether the battery is abnormally charged because of an interruption of supply of power or whether the battery is fully charged.

A charging device according to a second embodiment of the present invention will be described hereinbelow with reference to FIGS. 3 to 5.

Figure 3:
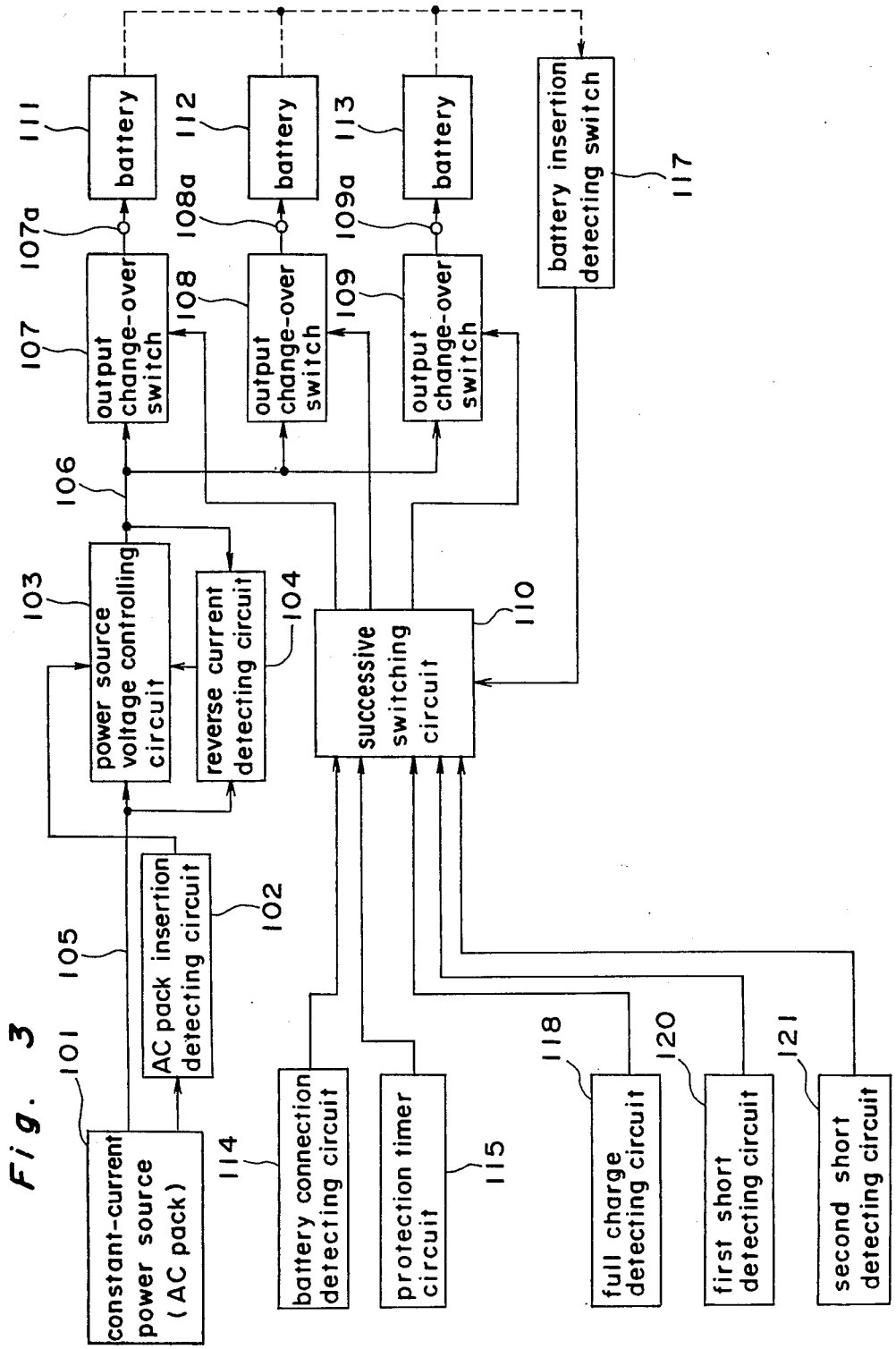
FIG. 3 is a block diagram showing a circuit of a charging device according to a second embodiment of the present invention.
Figure 4:
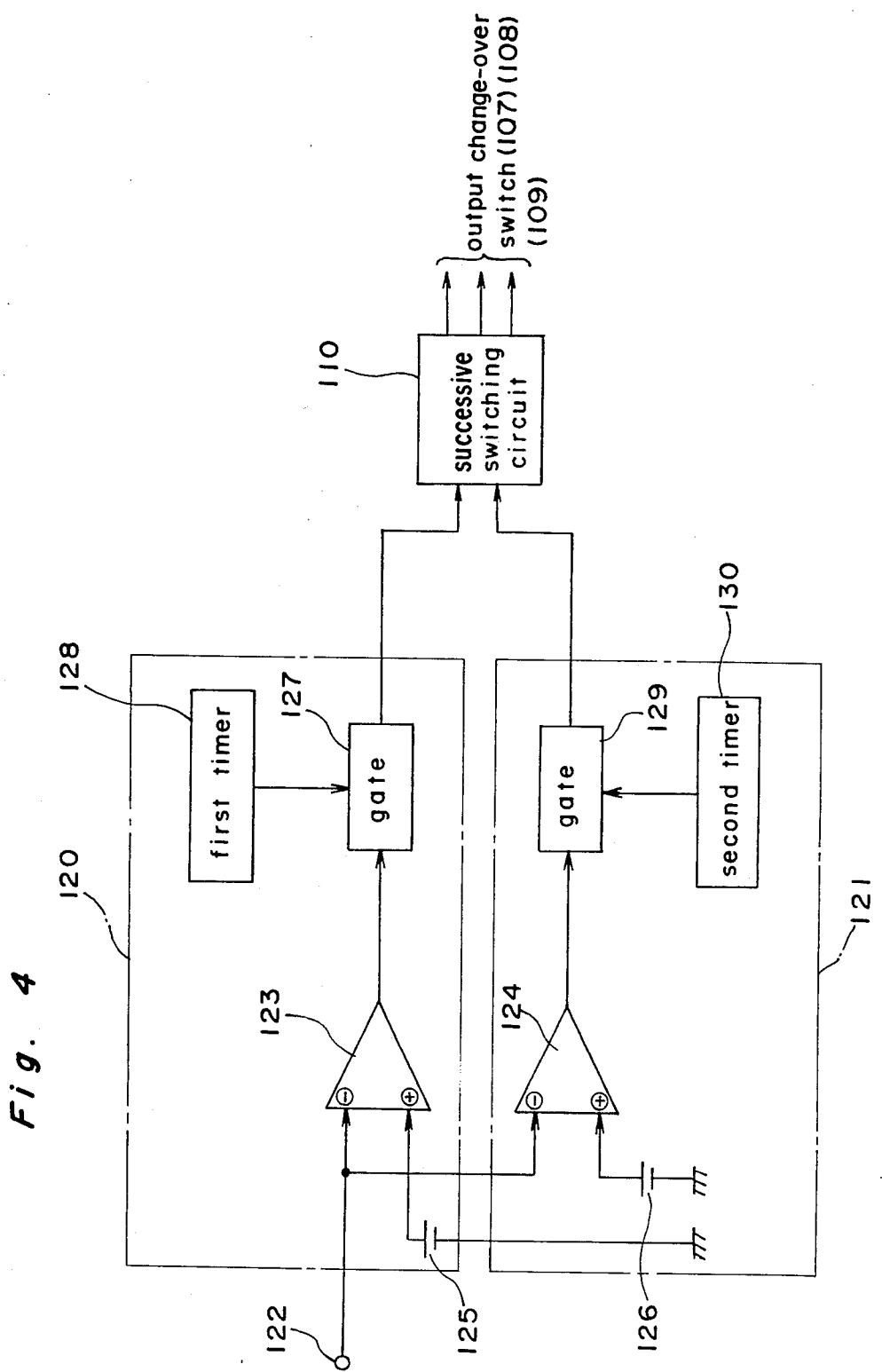
FIG. 4 is a circuit diagram of an essential part of FIG. 3.

Referring to FIG. 3 showing a block diagram of a circuit of a charging device according to the second embodiment, an AC pack 101 (source circuit) supplies an output of a constant current source, which is connected to an AC pack insertion detection circuit 102.

The AC pack 101 has the same physical configuration as a battery and can be accommodated to be used in a battery connected part of an apparatus using the battery. Therefore, the AC pack and the battery might be undesirably and erroneously connected to the charging device. If a battery which is not the constant current circuit is connected at a position where the AC pack should be connected, and the battery terminal is short-circuited, a large volume of current is produced to destroy the charging device. For preventing this, it should be detected by the AC pack insertion detection circuit 102 whether the AC pack 101 is connected at the given position.

When the voltage of a source line 105 is lowered as a result of an interruption of supply of power during the charging of the battery, etc., current may flow in a reverse direction from the side of a source line 106 to the side of the source line 105. Therefore, a reverse flow of the current is detected by the detection circuit 104 through comparison of the voltages between the source lines 105 and 106.

Because a source voltage control circuit 103 is provided in the charging device, in the case where it is detected by an output from the AC pack insertion detection circuit 102 or the reverse flow detection circuit 104 that the AC pack is not connected at the predetermined position or the current flows in the reverse direction, respectively, an output of the constant current source is stopped to be supplied from the AC pack 101 to the battery.

Output changing switches 107, 108 and 109, which are controlled to be on or off by a control signal from a successive switching circuit 110, lie between the source line 106 and batteries 111, 112 and 113 respectively.

A battery connection detection circuit 114 detects whether or not each of the batteries 111, 112 and 113 is connected to the respective terminal 107a, 108a or 109a.

The charging device further includes a protective timer circuit 115. The protective timer circuit 115 is reset by a control signal from the successive switching circuit 110. In the case of a battery employed which is completely charged rapidly for 60 minutes, the protective timer circuit 115 generates a timer output around 70 minutes after the start of the charging so as to avoid such an erroneous operation that the battery continues to be excessively charged even after it is fully charged.

A first short-circuit detection circuit 120 and a second short-circuit detection circuit 121 are provided in order to detect if the voltage at each terminal is, when each of the terminals 107a, 108a and 109a is connected to a short-circuited battery, abnormally decreased.

A battery insertion detection switch 117 detects mechanically whether or not each of the batteries is inserted into the position corresponding to the respective terminals 107a, 108a or 109a.

When the output voltage of each of the terminals 107a, 108a and 109a is changed, that is, the charging voltage is dropped by Δv from that at a steady state, the fact is detected by a full-charge detection circuit 118 which accordingly determines that the battery under charging has reached a fully-charged condition.

The successive switching circuit 110 is arranged to generate a control signal on the basis of an output from each of the battery connection detection circuit 114, the protective timer circuit 115, the first and the second short-circuit detection circuits 120 and 121, the battery insertion detection switch 117 and the full-charge detection circuit 118. In other words, the battery connection detection circuit 114 selects a switch among the output changing switches 107, 108 and 109 which should generate the control signal, while the full-charge detection circuit 118 determines the fact when the battery under charging is completely charged, and thereafter another battery which is recognized by the insertion detection switch 117 to be put in position is started to be charged. Moreover, at the same time, if the first and the second short-circuit detection circuits 120 and 121, and the battery connection detection circuit 114 detect that there is a terminal erroneously connected to a short-circuited battery or a disconnected battery, then, the supply of the source power to the terminal is stopped.

Next, referring to FIG. 4, the first and the second short-circuit detection circuits 120 and 121 will be described in detail. An input terminal 122 is connected to the source line 106 so as to be applied with the charging voltage of the battery being charged. This input terminal 122 is connected to a minus terminal of each of comparators 123 and 124. The comparators 123 and 124 are connected at their plus terminals to a first reference voltage source 125 and a second reference voltage source 126, respectively. It is to be noted here that the first reference voltage E1 is set to be 1.2V, and the second reference voltage E2 is set to be 6.8V.

Accordingly, the charging voltage is compared with the first reference voltage E1 by the comparator 123. The result of the comparison is sent to a gate circuit 127 which is controlled by a first timer circuit 128 to be selectively opened or closed. The first timer circuit 128 has a control time T1 of 10 seconds, and is reset by a control signal of that successive switching circuit 110 every time the output is switched from one of the output changing switches 107, 108 and 109 to another.

Accordingly, when a battery to be charged has been charged for 10 seconds, the gate circuit 127 is opened and the result of the comparison at the comparator 123 is supplied to the successive switching circuit 110.

Figure 5:
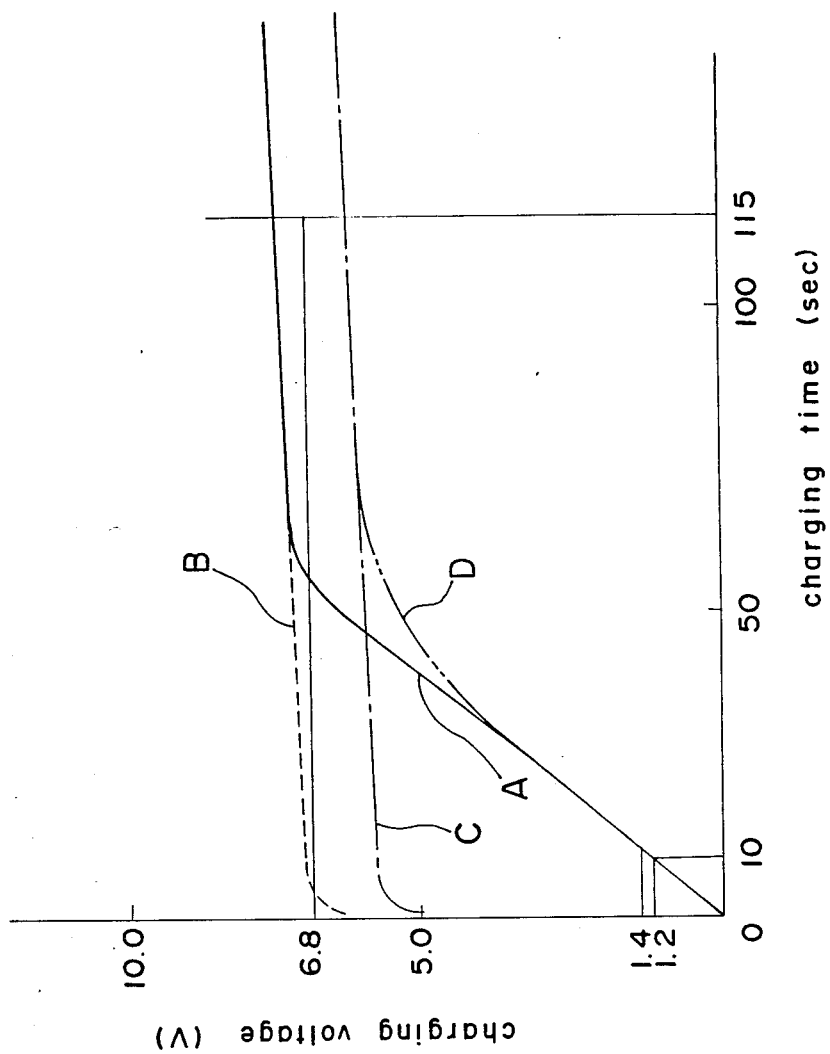
FIG. 5 is a graph showing the characteristic of the circuit of FIG. 3.

The reason why the set time T1 for the timer circuit 128 is selected to be 10 seconds results from the fact that it takes 10 seconds for the charging voltage to reach 1.2V in the charging characteristic curve A of an over-discharged battery shown by a solid line in FIG. 5. In other words, the set time is selected to be a threshold value at which the battery to be charged, in the case of an over-discharged battery, is not erroneously detected to be in a short-circuited condition. In FIG. 5, a chain line
represents the charging characteristic curve B of a normal battery.

Accordingly, the first short-circuit detection circuit 120 which is comprised of the comparator 123, the first reference voltage source 125, the first timer circuit 128 and the gate circuit 127 determines that the battery to be charged is not a short-circuited battery if the charging voltage comes to the first reference voltage E1 after 10 seconds have passed from the start of the charging, and a comparison output is generated in L level to the successive switching circuit 110. On the contrary, if the charging voltage does not reach the first reference voltage E1 10 seconds after the start of the charging, the first short-circuit detection circuit 120 judges that the battery to be charged is a short-circuited battery, thereby the circuit 110 being inputted with an H level comparison output. The successive switching circuit 110 generates a control signal for switching the battery to be charged to a new one immediately when the comparison output is an H level. Thus, since the first reference voltage E1 is set to be 1.2V, and the set time T1 is set to be 10 seconds, there is no fear that an erroneous detection or judgement will be made even in the case of the over-discharged battery showing the charging characteristic curve A of FIG. 5.

Meanwhile, the comparison of the charging voltage with the second reference voltage E2 is carried out at the comparator 124. An output of the comparator 124 is outputted to a gate circuit 129 which is controlled to be selectively opened or closed by a second timer circuit 130. In this case, the set time T2 for the second timer circuit 130 is set to be 115 seconds. Moreover, the second timer circuit is reset in the same manner as the first timer circuit 128 every time each of the output changing switches 107, 108 and 109 is switched. Because of this arrangement, when 115 seconds have passed after the start of the charging of one battery, the gate circuit 129 is turned on, and the results of the comparison by the comparator 124 is set to the successive switching circuit 110.

It is to be noted that the set time T2 of 115 seconds is so selected that within the time, the charging characteristic curve A of the over-discharged battery and the charging characteristic curve B of the normal battery shown in FIG. 5 can reach a level of 6.8V which is the second reference voltage E2. Moreover, the reason why the second reference voltage E2 is set to be 6.8V is as follows. Namely, the voltage E2 is so set that, when the battery pack to be used in the present embodiment includes five NiCd cells, each 1.2V and connected in series, at least one of which is short-circuited, the charging voltage of the battery never reaches the second reference voltage E2, as is clear from the charging characteristic curve C shown by a one-dotted line in FIG. 5. The charging characteristic curve C of FIG. 5 represents a characteristic diagram when the battery pack which has one short-circuited NiCd cell and four normal NiCd cells, is charged, while a charging characteristic curve D shown by a two-dotted line in FIG. 5 represents a characteristic diagram when one NiCd cell in the battery pack is short-circuited, and four of the five NiCd cells are over-discharged.

Accordingly, if the charging voltage reaches the second reference voltage E2 115 seconds after the start of the charging, the second short-circuit detection circuit 121 comprised of the comparator 124, the second reference voltage source 126, the second timer circuit 130 and the gate circuit 129 determines that there is not present a short-circuited NiCd cell in the battery pack, that is, the battery is not partially short-circuited. Then, the second detection circuit 121 generates a comparison output of L level to the successive switching circuit 110. If the charging voltage does not reach the second reference voltage E2 115 seconds after the start of the charging, the second detection circuit 121 judges that the battery is partially short-circuited, generating an H level comparison output. The successive switching circuit 110 switches to another battery to be charged in the same manner as when the first short-circuit detection circuit 120 generates an H level output.

Accordingly, the charging device of the present invention is highly valuable in practical use since the first short-circuit detection circuit can detect a not-short-circuited battery including an over-discharged battery, and the second detection circuit can detect a partially short-circuited battery.

Figure 6:
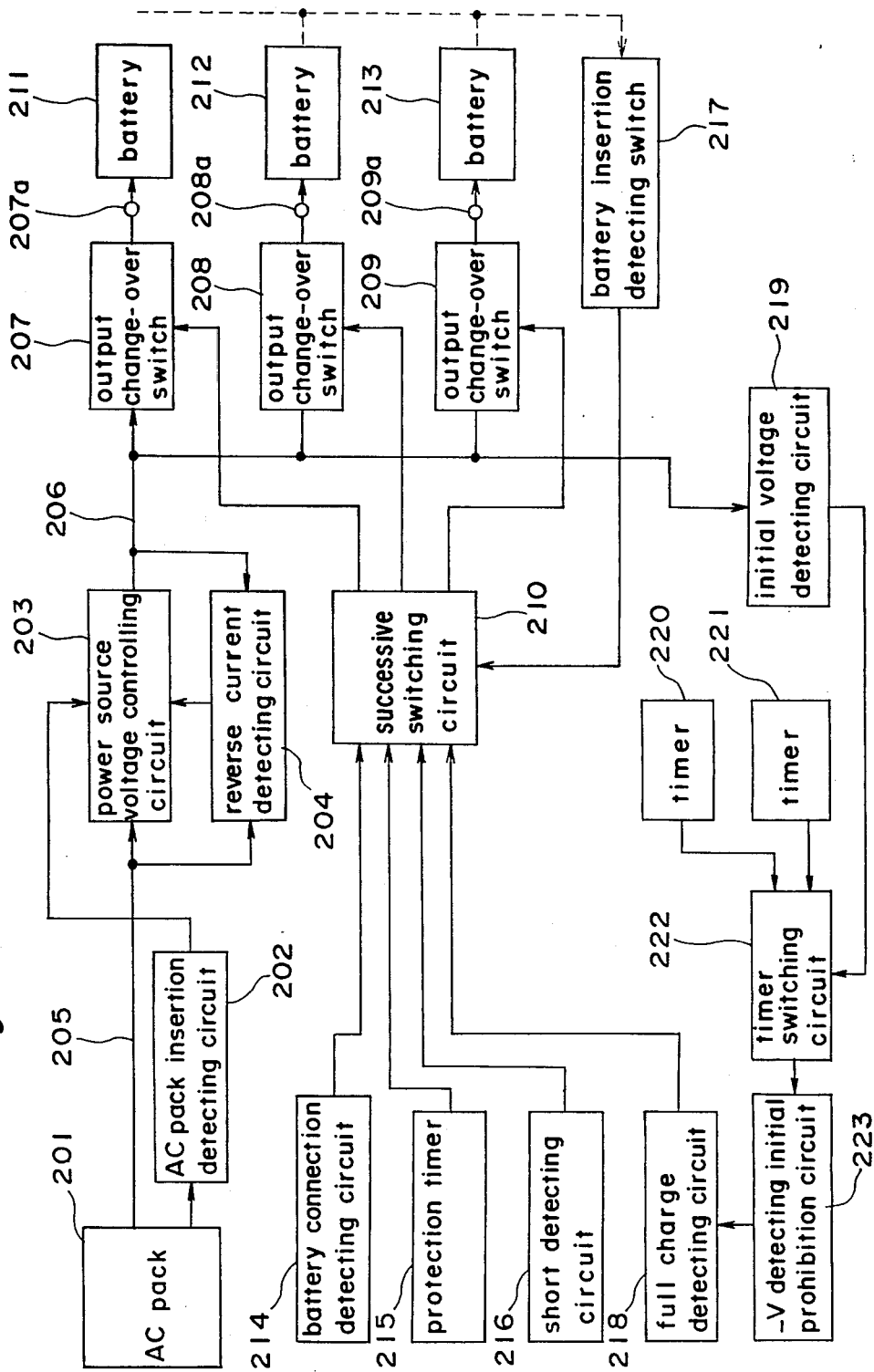
FIG. 6 is a block diagram showing a circuit of a charging device according to a third embodiment of the present invention.
Figure 7:
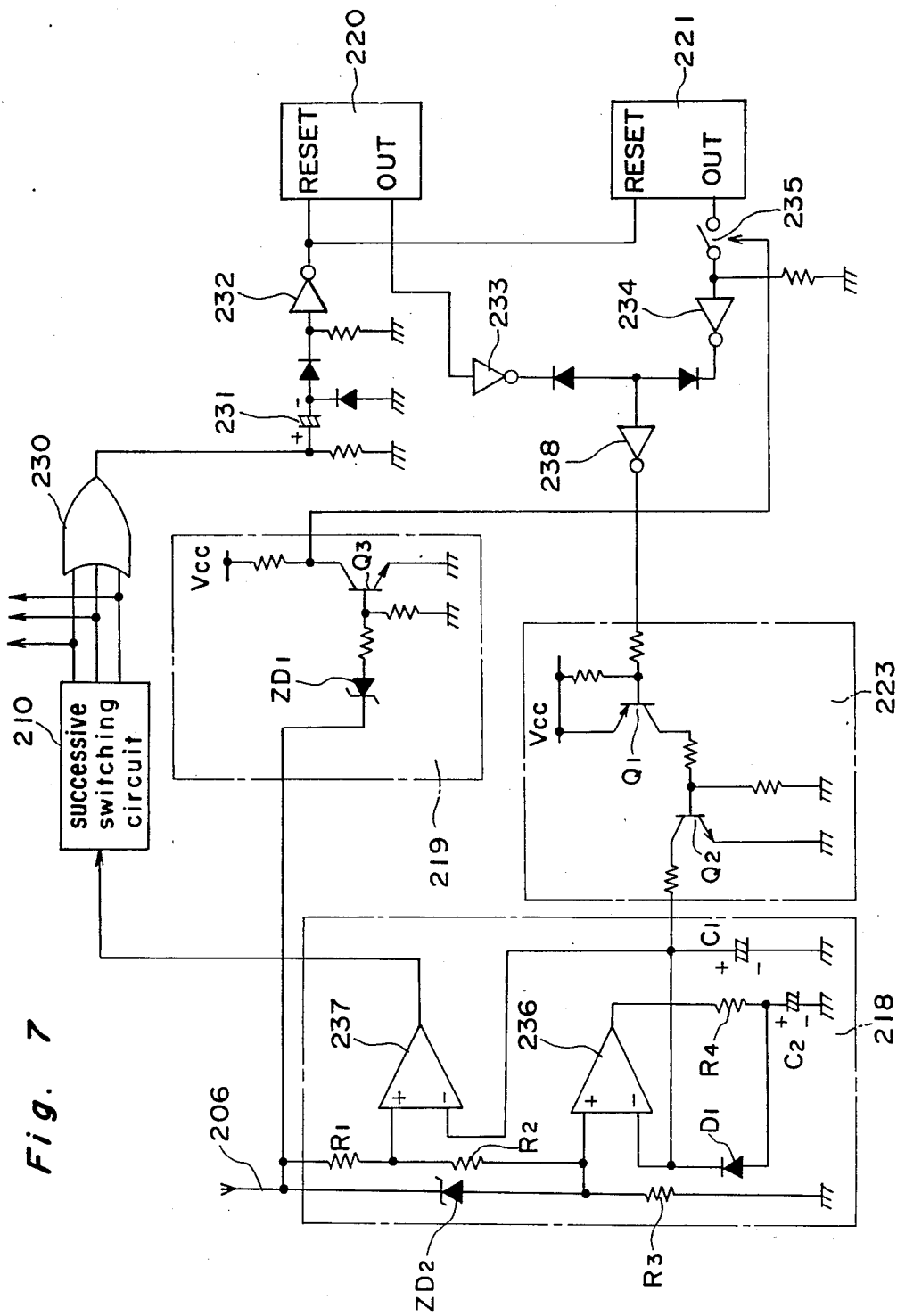
FIG. 7 is a circuit diagram of an essential part of FIG. 6.
Figure 8:
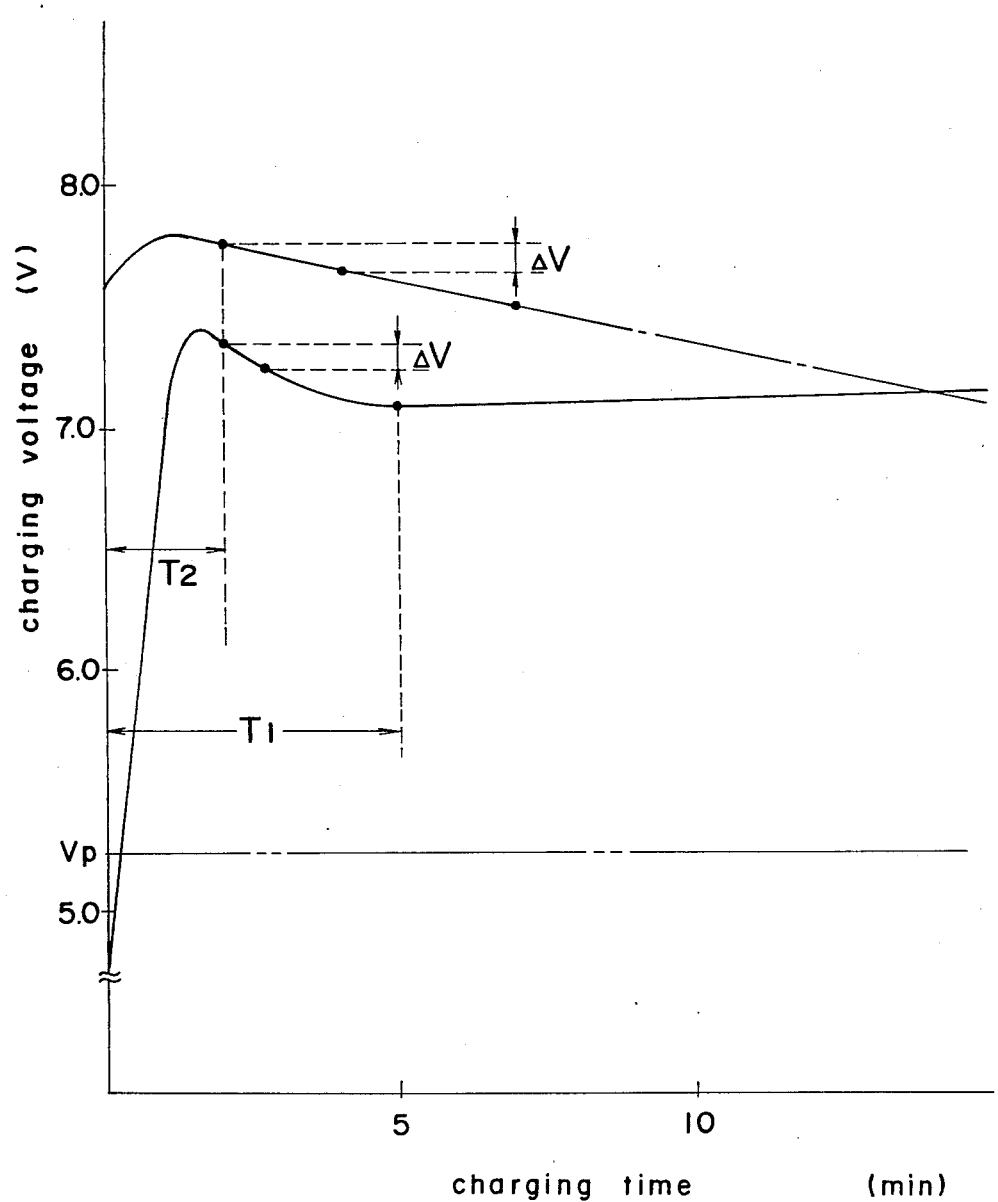
FIG. 8 is a graph showing the characteristic of the circuit of FIG. 6.

FIGS. 6 to 8 are related to a charging device according to a third embodiment of the present invention.

In FIG. 6, there is shown a block diagram of the charging device according to the third embodiment of the present invention. All of a constant current source 201, an AC pack insertion detection circuit 202, a source voltage control circuit 203, a reverse current detection circuit 204, source lines 205 and 206, output changing switches or timer change-over circuit 207, 208 and 209, terminals 207a, 208a and 209a, a successive switching circuit 210, batteries 211, 212 and 213, a battery connection detection circuit 214 and a protective timer circuit 215 are the same as the corresponding features 101, 102, 103, 104, 105, and 106, 107, 108 and 109, 107a, 108a and 109a, 110, 111, 112 and 113, 114 and 115 of the second embodiment shown in FIG. 3, and therefore, the explanation thereof will be abbreviated here for brevity.

The short-circuit detection circuit 216 is provided so as to detect an abnormal drop of the terminal voltage when each of the terminals 207a, 208a and 209a is connected to a short-circuit battery.

Meanwhile, the battery insertion detection switch 217 is provided so as to mechanically detect whether or not the batteries are connected to the respective terminals 207a, 208a and 209a.

The successive switching circuit 210 generates a control signal in accordance with an output from each of the battery connection detection circuit 214, the protective timer circuit 215, the short-circuit detection circuit 216, the battery insertion detection switch 217 and a full-charge detection circuit 218 which will be described later. More specifically, the battery connection detection circuit 214 selects a switch among the output changing switches 207, 208 and 209 which should generate a control signal, and the full-charge detection circuit 218 detects when the battery which is being charged is completely finished. Then, another battery which the battery connection detection circuit 214 decides to be in a connected condition is started to be charged. Further, the supply of the source output to a terminal which is determined by the short-circuit detection circuit 216 and the battery insertion detection switch 217 to be erroneously connected to a short-circuited battery is prevented.

Now, the full-charge detection circuit 218 and its attendant control circuit will be described.

A detection circuit 219 which detects the voltage at an initial stage of the charging is a discerning means which detects the voltage of the source line 206. Immediately after the start of the charging (200 to 500 msec after the start) during which time the successive switching circuit 210 generates a control signal, and any one of the output changing switches 207, 208 and 209 is closed, if the initial voltage is lower than a threshold value which is set beforehand at a predetermined level (about 5–7V), the battery which is just started to be charged is judged as an over-discharged battery. This judging output is inputted to the timer switching circuit 222.

When the battery is judged as an over-discharged battery, the timer switching circuit 222 supplies an output from the timer 220 to a Δv detection initial prohibition circuit 223. In other cases than the above, the timer switching circuit 222 supplies an output from the timer 221 to the Δv detection initial prohibition circuit 223.

Since the set time T1 for the timer 220 is set sufficiently long (for example, 5 minutes in the example of FIG. 8), the prohibition time during which the detection of Δv drop is prohibited is extended. Accordingly, the voltage drop of Δv since the charging characteristic of the over-discharged battery shown by a solid line in FIG. 8 indicates its peak until it moves to a steady state can be neglected.

The set time T2 for the timer 221 is set to be considerably shorter than the set time of the timer 220 (e.g., about 2 minutes in the example of FIG. 6). Both the timers 220 and 221 are reset by rising of the control signal generated from the successive switching circuit 210.

After the lapse of time T1 from the start of the charging upon the selection of the timer 220 when the battery is an over-discharged battery, or after the lapse of time T2 from the start of the charging upon the selection of the timer 221 when the battery is not an over-discharged battery (that is, a fully-charged battery or an unsatisfactorily fully-charged battery), a timer output is generated by the timer 220 or the timer 221 in the ΔV detection initial prohibition circuit 223 through the timer switching circuit 222.

Until the timer output is generated after the start of the charging, the prohibition circuit 223 prohibits the detection of the voltage drop by Δv by the full-charge detection circuit 218. Therefore, in the case of the overcharged battery used, the detection of the Δv drop is prohibited until the charging voltage reaches a steady state. On the other hand, in the case of an unsatisfactory fully-charged battery or a fully=charged battery, immediately after the lapse of the time T2 (initial prohibition time) set by the timer 221, the detection of the Δv drop of the charging voltage is started, thereby to detect whether the battery is fully charged. When the battery is fully charged, the full-charge detection circuit 218 generates a full charge detection output which is then inputted to the successive switching circuit 210. In consequence to this, a next battery is connected for charging. It is to be noted that the detection by the initial voltage detection circuit 219 is refrained for 0–200 msec after the output changing switches 207, 208 and 209 are switched from one to another for the purpose of avoiding influences by noises generated when the changing switches are switched. Further, the initial prohibition time T2 is prepared also in the case where the battery is not an over-discharged battery because there are possibilities that the characteristic of the $\Delta v$ drop at the initial stage of the charging will appear considerably early so long as an ordinary battery (which is not the over-discharged battery) is being discharged.

Referring to FIG. 7 showing a circuit diagram of the charging device according to the third embodiment of the present invention, a control signal for opening or closing each of the output changing switches 207, 208 and 209 generated from the successive switching circuit 210 is sent through an OR gate 230 and a condenser 231 to an inverter 232 and then reversed to be inputted to a reset terminal of each of the timers 220 and 221. An output from each of the timers 220 and 221 is supplied to the base of a transistor Q1 through inverters 233 and 234. Particularly, the output of the timer 221 is sent to the base of the transistor Q1 through a switch 235 corresponding to the timer switching circuit 222 described earlier. In addition, the transistor Q1 has its collector connected to the base of a transistor Q2. Thus, the transistor Q1 and the transistor Q2 constitute the prohibition circuit which prohibits the detection of the $\Delta v$ drop at the initial stage of the charging.

The collector of the transistor Q2 is connected to a (+) terminal of a condenser C1, and to a (−) terminal of each of first and second OP amplifiers 236 and 237. To an (+) input of the first OP amplifier 236 is applied a terminal voltage of a resistance R3 in the potential divider circuit formed of the source line 206, a second Zener diode ZD2 and the resistance R3. Moreover, the resistances R1 and R2 divide the voltage of a terminal voltage of the second Zener diode ZD2. A feed-back circuit is formed by a resistance R4 and a diode D1 between an output of the first OP amplifier 236 and the (−) input thereof. The voltage at the (−) terminal charges the condenser C1.

In short, the first OP amplifier 236 is utilized as a buffer amplifier, and the peak value of the terminal voltage of the resistance R3 is held at the hold condenser C1. There is provided a condenser C2 between the resistance R4 and the earth so that the full-charge detection circuit can be prevented from being operated erroneously because of the change in the charging voltage when the contact resistance of the charging terminal is changed by an oscillation or the like at the time of the charging.

Meanwhile, the second OP amplifier 237 is used as a comparison circuit, with the (+) terminal thereof being connected to a connection point of the resistances R1 and R2, and its (−) terminal being applied with the terminal voltage of the hold condenser C1. An output of the second OP amplifier 237 is supplied to the successive switching circuit 210.

The base of a transistor Q3 in the initial voltage detection circuit 219 is connected to the source line 206 through the first Zener diode ZD1, and accordingly, an output from the collector of the transistor Q3 controls the switch 235 to be opened or closed. It is to be noted that the Zener voltage of the first Zener diode ZD1 is a threshold value Vp (for example, more or less than 5–6V) to decide whether the battery is over-discharged. If the charging voltage just after the start of the charging is higher than the threshold value Vp, the transistor Q3 is electrically conductive, to turn the control signal low, thereby to close the switch 235.

The timers 220 and 221 are reset by rising of the control signal from t eh switching circuit 210. In other words, the timers 220 and 221 are reset as soon as the charging is started. When the timers 220 and 221 are reset, the timer 221 generates an L level output, and both the timers 220 and 221 are electrically conductive to discharge the charge from the hold condenser C1. The output of the timer 221 is turned from low to high the time T2 after the start of the charging, which output, through inverters 234 and 238, intercepts the transistors Q1 and Q2, so that the hold condenser C1 is charged.

During the charging of the battery, the (+) source line 206 is raised in accordance with the change of the terminal voltage of the battery. At this time, since the voltage at the (+) input of the second OP amplifier 237 is higher than that at the (−) input thereof, the second OP amplifier generates an H level output. However, when the charging is completed and the terminal voltage of the battery is reduced, the voltage at the (−) input becomes higher, and accordingly, the second OP amplifier 237 generates an L level output. As a result of this change, the successive switching circuit 210 stops the charging of the subject battery, and starts the charging of a next battery.

Since the initial voltage is lower than the Zener voltage of the Zener diode ZD1 when the battery is an over-discharged battery, the transistor Q3 is changed not to be electrically conductive, thereby opening the switch 235. Accordingly, after passing the time T1 from the start of charging, the timer 220 generates an output so as to cause the transistors Q1 and Q2 not to be electrically conductive. The operation for the $\Delta v$ full-charge detection is the same as is described earlier. Although the charging characteristic shown in FIG. 8 is related only to the fully-charged battery and the over-discharged battery, the charging characteristic of an unsatisfactorily fully-charged battery is such that it is higher than the threshold value Vp immediately after the start of the charging, and thereafter displays a steady state after a small voltage drop which is less than $\Delta v$ even when the peak value is passed, and accordingly, the start of the $\Delta v$ full-charge detection is observed the time T2 after the start of the charging in a similar manner to the case of the fully-charged battery.

As is described hereinabove, according to the their embodiment of the present invention, when an over-discharged battery is to be charged, the detection whether the battery is fully charged is prohibited in the region where the charging voltage drops immediately after the start of the charging, and accordingly an erroneous detection can be prevented. On the other hand, when a fully-charged battery or an unsatisfactorily fully-charged battery is to be charged, the detection of whether the battery is fully charged is promptly started, so over charging can be effectively prevented.

A charging device according to a fourth embodiment of the present invention will now be described hereinbelow with reference to FIGS. 9 and 10.

Figures 9A, 9E:
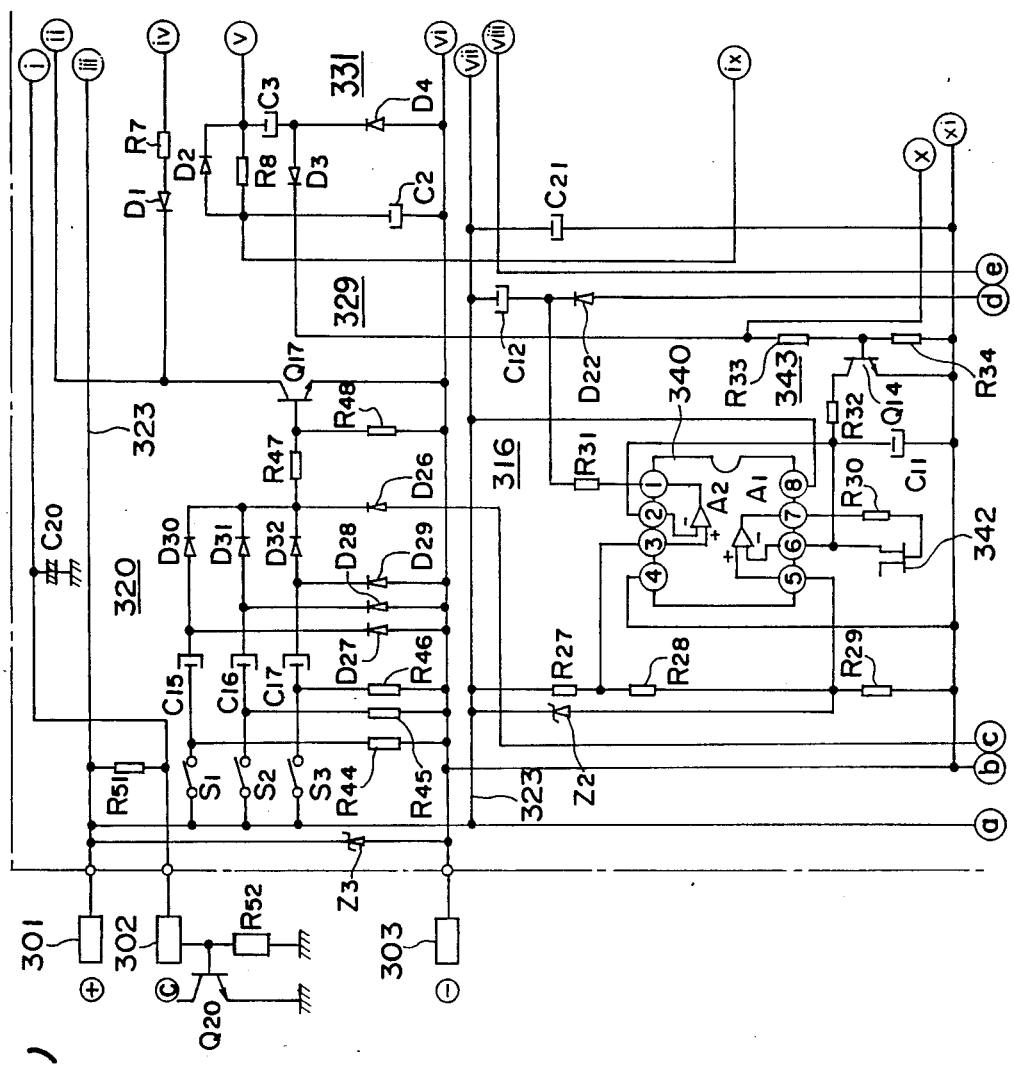
FIGS. 9(a) through 9(e) represent a block diagram showing a circuit of a charging device according to a fourth embodiment of the present invention.
Figure 9B:
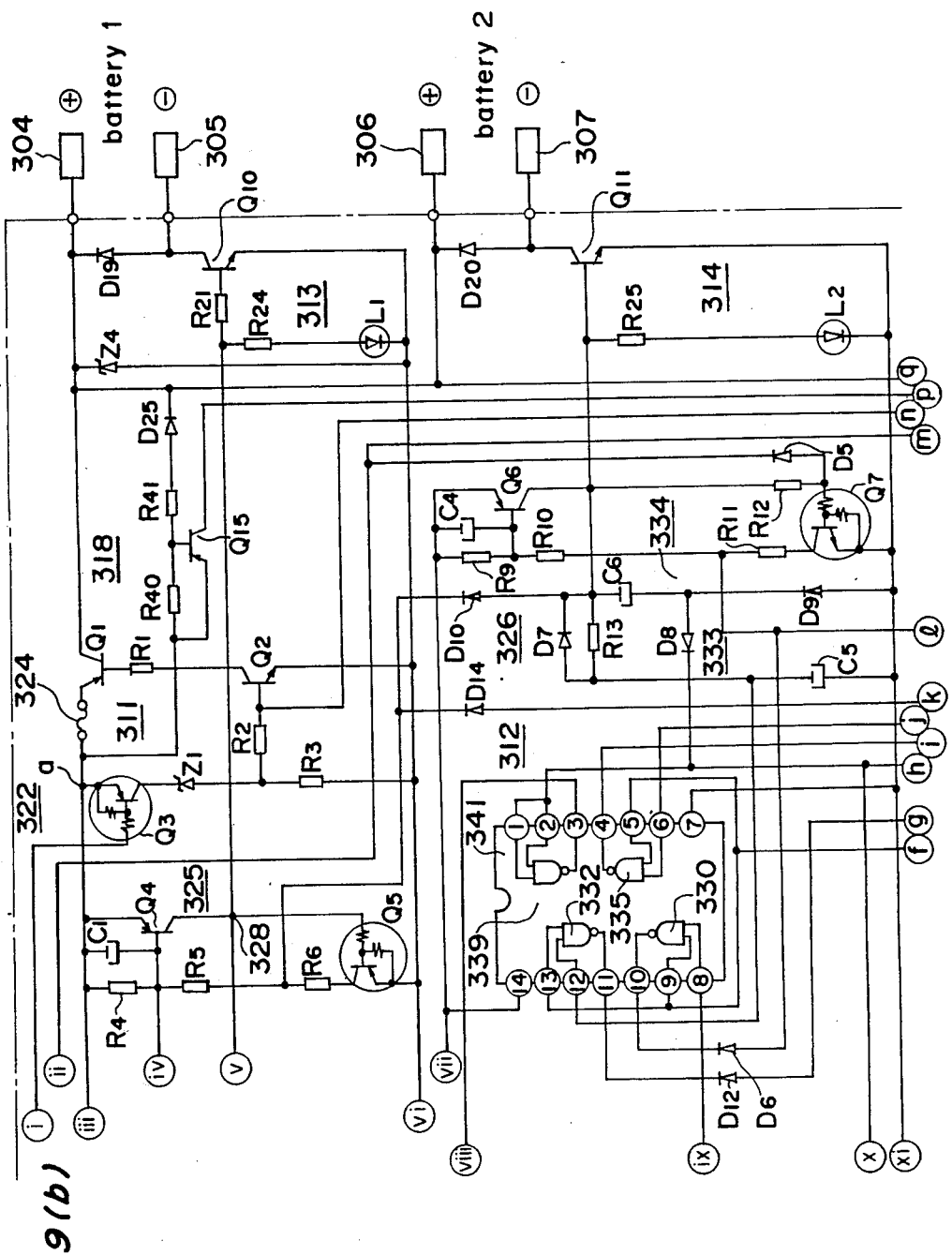
Figure 9C:
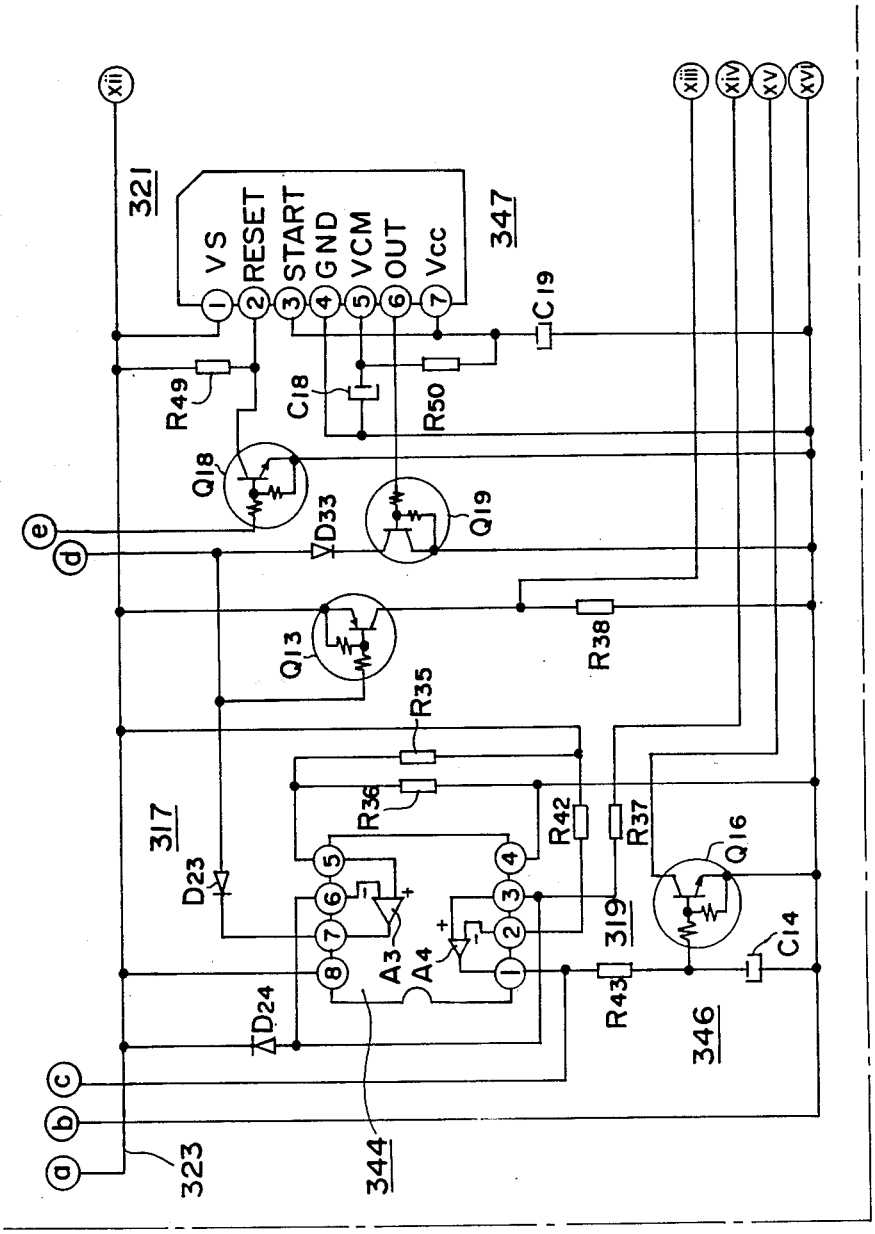
Figure 9D:
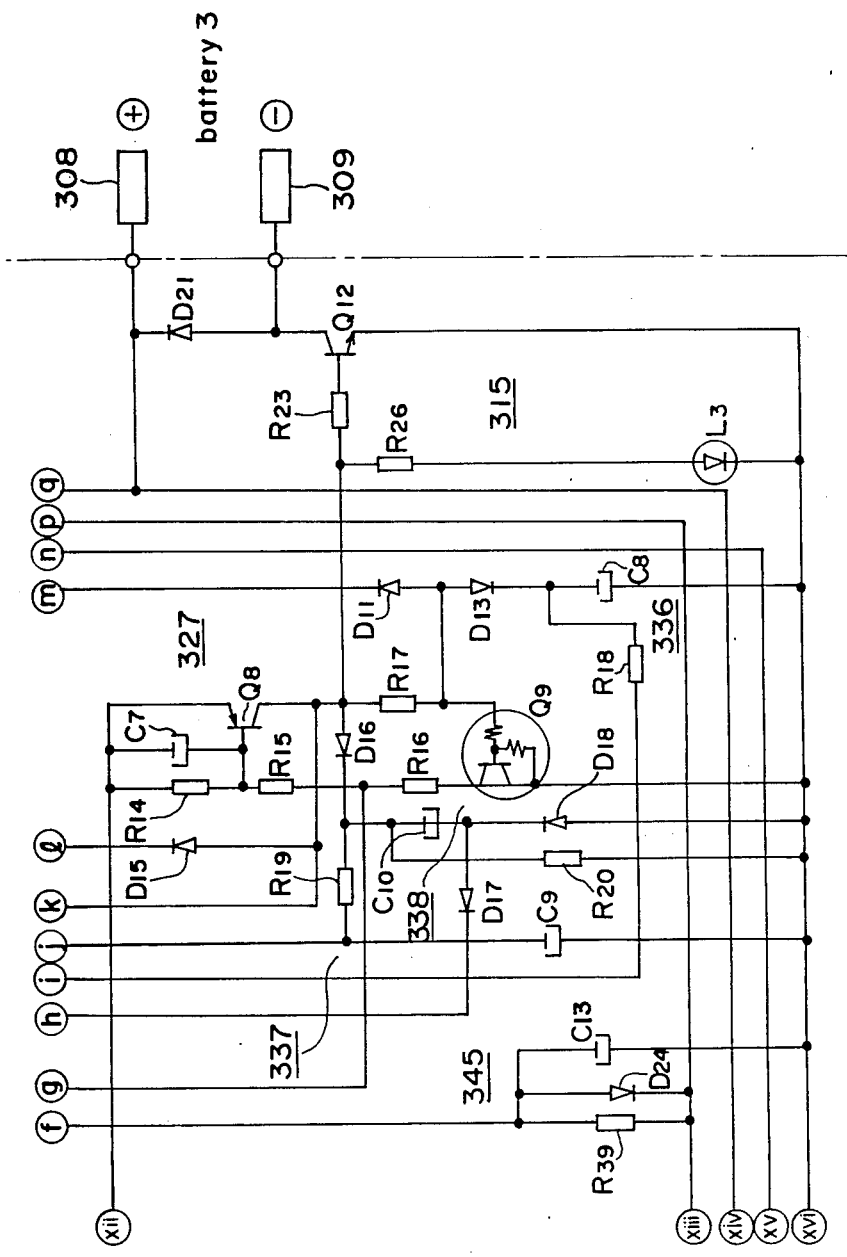

FIGS. 9(a)–(d) show a circuit diagram of a charging device according to the fourth embodiment of the present invention, which is divided into FIGS. 9(a), 9(b), 9(c) and 9(d) for the sake of convenience. (a)–(q) in FIG. 9(a) or 9(b) are respectively connected to (a)–(q) of FIG. 9(c) or 9(d) and (i)–(xvi) in FIG. 9(a) or 9(c) are respectively connected to (i)–(xvi) of FIG. 9(b) or 9(d).

The charging device has an AC pack (source circuit) (not shown) which is a power source connected to terminals 301, 302 and 303. In the charging device, a plurality of batteries (each having a rated capacity of 6V) (not shown) are connected to their respective battery connection terminals 304 and 305, 306 and 307, and 308 and 309 to be used.

To the terminal 301 is connected a (+) output terminal of the AC pack, and to the terminal 303 is connected a (−) output terminal (earth). The terminal 302 is a control terminal to be described later which controls whether the AC pack is operated by constant current (for charging a battery), or by constant voltage.

The charging device of FIG. 9 includes a source control circuit 311, a switching control circuit 312, first, second and third switch circuits 313, 314 and 315, a full-charge detection circuit 316, a battery connection detection circuit 317, a short-circuit detection circuit 318, a reverse flow detection circuit 319, an initial set circuit 320, a timer circuit 321 and a battery/AC pack detection circuit 322.

The source control circuit 311 is provided with a thermal fuse 324 (for protecting a first transistor) which is inserted in series into a (+) voltage (source) line 323, the first (series) transistor Q1, a second (control) transistor Q2, a first Zener diode (Z1) and resistances R1, R2 and R3. The first transistor Q1 has its collector connected to terminals 304, 306 and 308 to supply charging current (1.3 A) to each of the batteries.

The second transistor Q2 controls the condition of the first transistor Q1, and for this purpose, the second transistor Q2 has its collector connected to the base of the first transistor Q1 through the resistance R1. The first Zener diode Z1 has its anode connected to a connection point between the resistances R2 and R3, with its cathode being connected to the (+) voltage line 323 through the third transistor Q3 in the battery/AC pack detection circuit 322.

The other circuits in the charging device are supplied with power by the foregoing stage of the source control circuit 311.

When a normal battery is connected, for example, to the terminals 304 and 305, a point (a) in the source control circuit 311 is sufficiently high in voltage, and therefore the second transistor Q2 is turned on, and also the first transistor Q1 is turned on, thereby to let the charging current begin to flow. On the contrary, if a short-circuited battery is connected, the voltage at the point (a) is declined to a given voltage (about 6V) which is mainly determined by the first Zener diode (Zener voltage of 5.6V) since the AC pack is driven by constant current, and then the first and the second transistors Q1 and Q2 are brought into the off-state. Therefore, even when such a condition is present that a short-circuited battery is connected (that is, the battery connection terminals 304 and 305, 306 and 307 and, 308 and 309 are short-circuited), the short-circuit detection circuit 318 and the switching control circuit 312, etc. are supplied with voltage with which the circuits 318, 312, etc. are workable.

The switching control circuit 312 is composed of first, second, and third thyrister connection circuits 325, 326, 327, and their respective appendant circuits. Each of the first, the second and the third thyrister connection circuits 325, 326 and 327 maintains the condition which battery should be charged, and each of the appendant circuits successively changes the condition of the respective circuits 325, 326 and 327.

The first thyrister connection circuit 325 is comprised of a fourth transistor Q4, a fifth transistor Q5, resistances R4, R5 and R6, and a condenser C1 for preventing an erroneous operation. An output of the first thyrister connection circuit 325 is gained from a connection point 328 of the collector of the fourth transistor Q4 with the base of the fifth transistor Q5.

The first thyrister connection circuit 325 is turned into the on-state, generating an output of H level, by changing the base of the fourth transistor Q4 to L level. Further, the first thyrister connection circuit 325 is turned to the off-state, and generates an output of L level, by making the base of the fourth transistor Q4 at H level.

The output at L level is a charging starting signal (initially set signal) which is added to the base of the fourth transistor Q4 through a first diode D1 and a resistance R7. To the connection point of the resistances R5 and R6, a signal to bring the first thyrister connection circuit 325 to the off-state under a H level of the base of the fourth transistor Q4 is applied.

An output from the first thyrister connection circuit 325 is supplied directly to the first switch circuit 313. This output from the first thyrister connection circuit after being delayed about 5 seconds is also applied to a first NAND gate 330 through a delay circuit 329 consisting of a resistance R8, a condenser C2 and second diode D2. A reset pulse for the full-charge detection circuit 316 and the timer circuit 321 is formed by the output of the first thyrister connection circuit through a condenser C3, a third and a fourth diodes D3 and D4 which constitute a rising differential circuit 331.

The second thyrister connection circuit 326 is comprised of sixth and seventh transistors Q6 and Q7, resistances R9, R10, R11 and R12, and a condenser C4 for preventing an erroneous operation. When and since the seventh transistor Q7 is supplied with the charging starting signal through a fifth diode D5, not only the first thyrister connection circuit 325 is turned on, but the second thyrister connecter circuit 326 is turned off. As the connecting point between resistors R10, R11 is connected to the output of the first NAND gate 330 through the sixth diode D6, by turning the output of the first NAND gate 330 onto a L level, the second thyrister connection circuit 326 is rendered to turn on.

An output of the second thyrister connection circuit 326 is directly added to the switch circuit 314, and is supplied to a second NAND gate 332 through a rising delay circuit 333 consisting of a resistance R13, a condenser C5 and a seventh diode D7 (with the delay time of about 5 seconds).

A reset pulse to the timer circuit 321 and the full-charge detection circuit 316 is formed by a rising differential circuit 334 which is comprised of an eighth, a ninth diodes D8 and D9, and a condenser C6. The output is applied, through a tenth diode D10, to the connection point of the resistances R6 and R5.

The third thyrister connection circuit 327 includes an eighth and a ninth transistors Q8 and Q9, resistances R14, R15, R16 and R17, and a condenser C7 which is provided for prevention of an erroneous operation.

The base of the ninth transistor Q9 is brought to L level through an eleventh diode D11 by the charging starting signal, thereby to be in the off-state. When an output of the second NAND gate 332 is applied to a connection point of the resistances R15 and R16 through a 12th diode D12, the third thyrister connection circuit 327 is turned on. Moreover, an output of a third NAND gate 335 is applied to the base of the ninth transistor Q9 through an integrating circuit 336 formed by a resistance R18 and a condenser C8, and a 13th diode D13.

An output of the third thyrister connection circuit 327 is obtained through a connection point of the collector of the eighth transistor Q8 and the base of the ninth transistor Q9. This output is generated directly to the third switch circuit 315. Further, the output is applied to the connection point of the resistances R5 and R6 in the first thyrister connection circuit 325 through a 14th diode D14, and also to the connection point of the resistances R10 and R11 in the second thyrister connection circuit 326 through a 15th diode D15.

Through a 16th diode D16, the output of the third thyrister connection circuit is supplied to a delay circuit 337 (having the delay time of approximately 5 seconds) formed by a resistance R19 and a condenser C9, and also to a rising differential circuit 338 which is composed of a condenser C10, a 17th and an 18th diodes D17 and D18 and a resistance R20. The output supplied to the delay circuit 337 is applied to the third NAND gate 335, while that applied to the rising differential circuit 338 is outputted in the form of a reset pulse to the full-charge detection circuit 316 and the timer circuit 321.

The delay time of each of the delay circuits 329, 333 and 337 arranged in the respective first, second and third thyrister connection circuits 325, 326 and 327 is set to be about five seconds as is described above. This period of time 5 seconds is that required for the over-discharged battery (NiCd cell) shown in FIG. 10 when the charging voltage characteristic thereof reaches the vicinity of a steady state voltage (around 7V) which appears first immediately after the start of the charging. It is to be noted here that the characteristic diagram of FIG. 10 shows the charging voltage characteristic of an over-discharged battery which has been discharged for three days by the resistance of 1.5 Ω within 60° C.

A reset pulse from each of the first, the second and the third thyrister connection circuits 325, 326 and 327 is applied to the timer circuit 321 through an inverter 339 (which is formed by the fourth NAND gate). It is so designed that a switching signal from each of the full-charge detection circuit 316, the battery connection detection circuit 317, the short-circuit detection circuit 318 and the timer circuit 321 is applied to the first, the second and the third NAND gates 330, 332 and 334 in IC341.

The reset pulse is so set as to have approximately three minutes of the width which is determined in relation to the operation of the full-charge detection circuit 316. In other words, the reset pulse is set in order to avoid detection of the change of the terminal voltage of the completely-discharged battery approximately one minute after the start of charging which is similar to the case of the fully-charged battery.

The discharging of the condensers C3, C6 and C10 for forming the reset pulse is carried out in the first and the second thyrister connection circuits 325 and 326 by resistances R21, R22 and light emitting diodes L1, L2 of the corresponding first and second switch circuits 313 and 314. On the other hand, since, at this time, the discharge by the resistor R26 and LED L3 cannot be rendered, if the condenser C10 and the base of the ninth transistor Q9 are directly connected to each other in the third thyrister connection circuit 327, it may undesirably happen that the third thyrister connection circuit 327 cannot be turned into the off-state. Therefore, as shown in FIG. 9, the 16th diode D16 is provided. In addition, a resistance R20 is provided so as to discharge the condenser C10.

When the switching control circuit 312 having the above-described construction is applied with a charging starting signal, the first thyrister connection circuit 325 is turned on, while the second and the third thyrister connection circuits 316 and 327 are brought into the off-state. Thereafter, upon application of a switching signal, the second thyrister connection circuit 326 is turned on, while the first and the third thyrister connection circuits 325 and 327 are turned off. Then, when a further switching signal is applied, the third thyrister connection circuit 327 is brought into the on-state, and the first and the second thyrister connection circuits 325 and 326 are turned off.

Thereafter, still in the above-described state, when a switching signal is added to the first, the second and the third NAND gates 330, 332 and 335, the third thyrister connection circuit 327 is also turned off. Thus, all of the thyrister connection circuits are in the off-state.

The first, the second and the third switch circuits 313, 314 and 315 are provided with a 19th diode D19, the tenth transistor Q10 and the resistance R21, a 20th diode D20, the eleventh transistor Q11 and the resistance R22 and, a 21st diode D21, a 12th transistor Q12 and a resistance R23, respectively.

When the thyrister connection circuits corresponding to the respective switch circuits 313, 314 and 315 are in the on-state, each of the transistors Q10, Q11 and Q12 is turned on. In other words, each of the corresponding batteries is supplied with the charging current.

Moreover, while the batteries are being charged, the current flows in corresponding light emitting diodes L1, L2 and L3 through respective resistances R24, R25 and R26, lighting the diodes L1, L2 and L3. Accordingly, which battery is being charged can be indicated.

The full-charge detection circuit 316 is arranged to detect the drop of the terminal voltage after completion of the charging of the NiCd battery. An IC ($\mu$pc 4082) having two OP amplifiers A1 and A2 is a main component of the full-charge detection circuit 316.

A (+) input of the first OP amplifier receives a terminal voltage of a resistance R29 in a potential divider circuit formed by the (+) source line 323, and resistances R27, R28 and R29 and the second Zener diode Z2 (4.7V). The resistances R27 and R28 are, respectively, connected at their ends to a second Zener diode Z2 (4.7V). Between an output and a (−) input of the first OP amplifier A1 is formed a feed-back circuit comprised of a resistance R30 and an FET 342. The voltage at the (−) terminal of the feed-back circuit charges a condenser C11 of 100 $\mu$F.

In short, the first OP amplifier A1 is used as a buffer amplifier, and a peak value of the terminal voltage of the resistance R29 is held at the hold condenser C11. It is to be noted that the FET 342 enhances the impedance, lessening the discharge of the hold condenser C11.

The second OP amplifier A2 is used as a comparator circuit, which has its (+) terminal connected to a connection point of the resistances R27 and R28, with its (−) terminal connected to the terminal voltage of the hold condenser C11. The second OP amplifier generates an output to be sent, through a resistance R31 and a condenser C12, to the (+) source line 323. A connection point of the resistance R31 with the condenser C12 is led through a 22nd diode D22 to the base of a 13th transistor Q13 for forming a switching signal.

The hold condenser C11 is connected to a discharge circuit 343 which is composed of a resistance R32, a 14th transistor Q14 and resistances R33 and R34. The 14th transistor Q14 is turned on by a reset pulse from each of the first, the second and the third thyristor connection circuits 325, 326 and 327 so as to discharge the charge from the hold condenser C11.

During the charging of the battery, the (+) source line 323 is raised in accordance with the change in the terminal voltage of the battery. Therefore, since the voltage at the (+) input of the second OP amplifier A2 is higher than that at the (−) input, the second OP amplifier generates an H level output. When the battery is completely charged, however, the terminal voltage of the battery drops. Then, the voltage at the (−) input of the second OP amplifier becomes higher than that at the (+) input, and the second OP amplifier A2 generates an L level output. Because of this change in the output from the second OP amplifier, the 13th transistor Q13 is turned on, thereby forming a switching signal and bringing the first, the second and the third thyristor connection circuits 325, 326 and 327 into a succeeding state. At this time, as described above, a reset pulse is formed to discharge the charge of the hold condenser C11 in preparation for a next detection whether a battery is fully charged.

The battery connection detection circuit 317 detects whether or not each of the batteries is connected to corresponding battery connection terminals 304, 305, 306 307, 308 and 309, by the presence or absence of the voltage drop by the first transistor Q1. For this purpose, a third OP amplifier A3 in an IC (μpc 4082 and the like of type having an input of FET) 344 constitutes a comparison circuit. A (+) input of the third OP amplifier A3 is applied with a divided voltage of a potential divider circuit formed by resistances R35 and R36 connected to the (+) source line 323. On the other hand, a (−) input of the third OP amplifier A3 is connected through a resistance R37 to the collector of the first transistor Q1. An output generated from the third OP amplifier A3 is connected to the base of the 13th transistor Q13 through a 23rd diode D23.

A 24th diode D24 is provided in order to protect the IC 344 is such case that only the charged battery is connected, without the AC pack being connected.

When the battery is connected to a selected battery connection terminal and is being charged, an output of the third OP amplifier A3 is at H level because the voltage at the (+) input of the OP amplifier A3 is higher than that at the (−) input thereof. On the contrary to this, when the selected terminal is opened, the voltage at the (−) input is rendered higher, so that the third OP amplifier A3 generates an L level output.

Then, the 13th transistor Q13 is turned on, which raises the terminal voltage of a resistance R38. The rising of the terminal voltage of the resistance R38 is delayed by a rising delay circuit 345 formed by a resistance R39, a condenser C13 and a 24th diode D24 to be applied as a switching signal to the first, the second and the third NAND gates 330, 332 and 335. The rising delay circuit 345 is provided so as not to utilize as a switching signal the change of the output of the third OP amplifier A3 resulting from the change of the condition of each of the first, the second and the third thyristor connection circuits 325, 326 and 327.

The short-circuit detection circuit 318 includes resistances R40 and R41, a 25th diode D25 and a 15th transistor Q15. In the 15th transistor Q15, an emitter is connected at the left end of the thermal fuse 324 to the (+) source line 323. A cathode of the 25th diode D25 is connected to the collector of the first transistor Q1. A collector of the 15th transistor Q15 is connected to the rising delay circuit 345.

The 15th transistor Q15 is brought into the on-state when the battery terminal is abnormally low in voltage, and an H level output is supplied to the rising delay circuit 345. It is when a short-circuited battery is connected or for 1-2 seconds after the start of the charging of a battery which is completely discharged that the battery terminal displays the abnormally low voltage.

Figure 10:
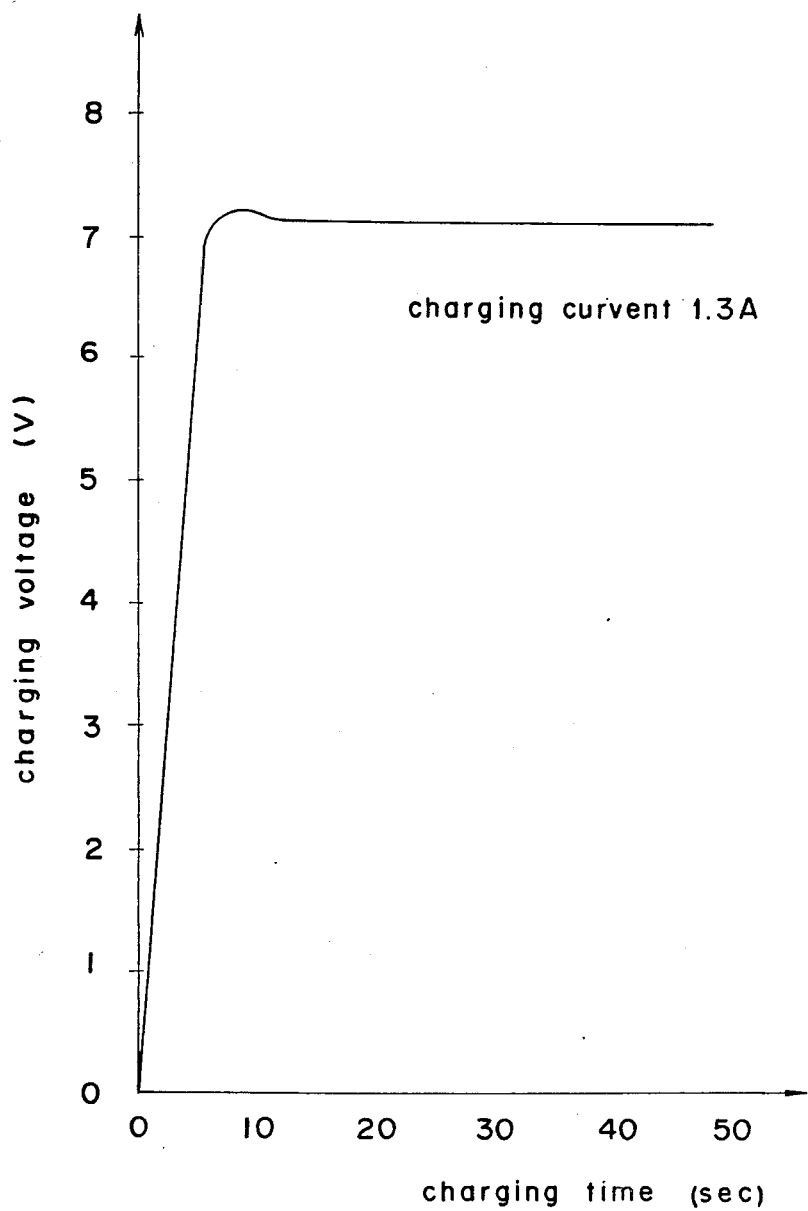
FIG. 10 is a graph showing the characteristic of the circuit of FIGS. 9(a)–9(e).

More specifically, with reference to FIG. 10, the time when the battery terminal displays the abnormally low voltage corresponds to the time period until the charging voltage attains 2V (reference voltage) since the start of the charging. Even when a completely-discharged battery is started to be charged, if each of the resistances R40 and R41 is set to be at a suitable resistance value, the 15th transistor Q15 is turned to the on-state when the terminal voltage of the battery is less than 2V, while it is brought to the off-set when the terminal voltage is over 2V.

When the terminal voltage of the battery is less than 2V, with the 15th transistor being in the on-state, another input to each of the first, the second and the third NAND gates 330, 332 and 335 as a detection order signal is delayed about 5 seconds from the start of the charging, namely, the time primarily set by the delay circuits 329, 333 and 337 and in which the charging voltage becomes sufficiently larger than the reference voltage, and consequently, the condition of each of the first, the second and the third thyristor connection circuits 325, 326 and 327 is not changed. In other words, only when a short-circuited battery is connected to the charging device, it becomes effective that the 15th transistor Q16 is in the on-state, and accordingly the condition of each of the first to the third thyristor connection circuits 325, 326 and 327 is changed.

The reverse flow detection circuit 319 is mainly composed of a fourth OP amplifier A4 of the IC 344. A (+) input of the fourth OP amplifier A4 is connected to the collector of the first transistor Q1 through the resistance R37, while a (−) input of the OP amplifier A4 is, through a resistance R42, connected to the (+) source line 323. An output of the fourth OP amplifier A4 is connected to the initially set circuit 320 through a resistance R43, a delay circuit 346 (200 msec. to 1 sec.) composed of a condenser C14, and a 26th diode D26.

A connection point between the resistance R43 and the condenser C14 is connected to a base of a 16th transistor Q16. A collector of this 16th transistor Q16 is connected to the base of the second transistor Q2.

If the voltage at the (+) source line 323 drops due to an interruption of supply of power while the battery is being charged, the (+) input of the fourth OP amplifier A4 becomes higher in voltage than the (−) input, so that the output of the fourth OP amplifier A4 is changed to H level, with the 16th transistor Q16 being turned on. As a result, both the first and the second transistors Q1 and Q2 are brought into the off-state, thereby to release the connection of the battery with the other circuits.

Therefore, it can be prevented that the battery is discharged even in the case of the interruption of supply of power or the like. the delay circuit 346 is placed in relation to the initially set circuit 320.

There are provided in the initially set circuit 320 a first, a second and a third switches S1, S2 and S3 which are turned on through mechanical connection to respective first, second and third batteries, resistances R44, R45 and R46, condensers C15, C16 and C17, 27th, 28th and 29th diodes D27, D28 and D29, 30th, 31st and 32nd diodes D30, D31 and D32 and, resistances R47, R48, and a 17th transistors Q17 corresponding to the respective switches.

When the AC pack is connected to the terminals 301, 302, and 303, with supply of power effected, and at least one of the first, second and third switches is turned on, that is, at least one battery is connected to the charging device, the terminal voltage at teach of the resistances R44, R45 and R46 is raised, the rising differential output of which brings the 17th transistor Q17 into the on-state through the 30th, 31st and 32nd diodes D30, D31 and D32.

In other words, the collector of the 17th transistor Q17 becomes consequently at L level, and accordingly the initially set signal is applied to the first, second and third thyrister connection circuits 325, 326 and 327. Then, only the first thyrister connection circuit 325 is brought into the on-state, but the second and the third thyrister connection circuits 326 and 327 are brought into the off-state. Accordingly, in the state that the supply of power from the AC pack is continued, the initial setting is performed through connection of the battery so as to start the charging.

Meanwhile, when the (+) source line is applied with voltage through the change in the condition from that at least one battery is connected to the charging device to that the AC pack is connected to the charging device, similarly, the terminal voltage at each of the resistances R44, R45 and R46 is raised, and thus, the 17th transistor Q17 is changed into the on-state. A constant of each of the condensers C15, C16 and C17 is so set that an output from the 17th transistor Q17 is changed to L level for a sufficient time after the rising of the voltage of the (+) source line 323 so as to make sure the initial setting.

On the other hand, in the case where the supply of power is interrupted for a relatively short period of time (about 200 msec.), there is a fear that the condensers C15, C16 and C17 do not respond to the rising of the voltage of the (+) source line 323. Since all of the first, the second and the third thyrister connection circuits 325, 326 and 327 are turned off even by such an interruption for a short time as described above, a problem is given rise to that charging will not be started again if the interruption occurs when charging is being carried out.

Therefore, the charging device is provided with the delay circuit 346 and the 26th diode D26. When a short-time interruption of supply of power takes place, the first transistor Q1 is not changed into the off-state promptly, but is held in the on-state for a time period t1 set by the delay circuit 346. Accordingly, the (+) source line 323 can be supplied with power by the connected battery for this period of time t1.

Simultaneously with the occurrence of the interruption of supply of power, the output of the fourth OP amplifier A4 is changed to H level, and accordingly, the 17th transistor Q17 is turned on through the 26th diode D26. At this time, since the (+) source line 323 is connected to the battery voltage, the first, second and third thyrister connection circuits 325, 326 and 327 are initially set. That is, even when the interruption is for such a short period of time that each of the condensers C15, C16 and C17 in the initial set circuit 320 do not respond, the initial setting can be performed with certainty.

The timer circuit 321 has an IC (TA 7326) as a main component, with resistances 49 and 50, condenser C18 and C19, an 18th transistor Q18 for setting, a 19th transistor Q19 for outputting and a 33rd diode D33 being provided outside.

The timer circuit 321 is set by a reset pulse generated by the first, second and third thyrister connection circuits 325, 326 and 327. In the case, for example, where the charging is rapidly completed for 60 minutes, the timer circuit 321 is so set as to generate an H level output from a sixth pin about seventy minutes later. Upon generation of the H level output from the sixth pin in the timer circuit 321, the 19th transistor Q19 is turned on, and then the 13th transistor Q13 is turned on, thereby to form a switching signal.

The battery/AC pack detection circuit 322 is provided with a third transistor Q3, a condenser C20 and a resistance R51. As has been mentioned earlier, the AC pack has the same configuration as the battery and therefore, can be used while being contained in a battery connection part of an apparatus using a battery. Therefore, the AC pack and the battery might be undesirably and erroneously connected to the charging device. If a battery different from a constant current circuit is connected to a position where the AC pack should be connected, and if the battery terminal is short-circuited, it is feared that the charging device could be damaged or destroyed due to a large volume of current produced thereby.

However, since the battery has no terminal corresponding to the terminal 302 which is therefore opened, the third transistor Q3 is turned into the off-state. The first and the second transistor Q1 and Q2 are turned off then. As a result, even when the battery terminal is short-circuited, the fear that a large volume of current flows disappears.

The AC pack is provided with a terminal corresponding to the terminal 302, to which is connected the base of the transistor Q20. It is so designed that when the transistor Q20 is in the on-state, the constant current operation is carried out, while on the other hand when the transistor Q20 is in the off-state, a constant voltage operation is carried out. On the other hand, the third transistor Q3 is connected at its base to the ground through a base resistance R52 to be in the on-state, and accordingly the first and the second transistors Q1 and Q2 can be turned on.

A time constant by the resistance R51 and the condenser C20 is so set as to be equal to or more than a time constant of the delay circuit 346 in the reverse flow detection circuit 319. This is because if the third transistor Q3 is turned off promptly in an instantaneous interruption of supply of power as described before, the initial setting is disabled for the first, second and third thyrister connection circuits 325, 326 and 327.

It is to be noted here that third and fourth diodes Z3 and Z4 are provided for the purpose of protection.

As is described hereinabove, in the charging device of the fourth embodiment of the present invention, the switching control circuit 312 is initially set through connection of the battery or the AC pack, and the three batteries are successively charged one after another while being detected whether it is fully charged until they are completely charged.

In the case where the battery terminal which is not connected with the battery is selected, the battery connection detection circuit 317 is driven so as to start the charging of a next battery.

If the selected battery terminal is in the short-circuited condition, both the AC pack and the battery terminal are intercepted by the source control circuit 311, and at the same time a next battery is charged on the basis of an output from the short-circuit detection circuit 318.

Moreover, if an interruption of supply of power or the like is given rise to, operation of the reverse flow detection circuit 319 is started so that the battery which is being charged is prevented from being discharged.

Furthermore, if the AC pack and the battery are erroneously connected, the source control circuit 311 is cut off by the battery/AC pack detection circuit 322, and accordingly the circuit is never destroyed.

In the case where the battery should be exchanged or the supply of power is interrupted during charging, since the switching control circuit 312 is always set at the initial state by the initial set circuit 320, there is no fear that the three batteries will remain connected without being charged. Also, it is to be noted that the resistors R21, R22, R23 are usually set at given values smaller than that of the resistor R1. This is because, for instance, in the case where a short-circuited battery is connected between the terminals 304, 305 so as to cause the power consumption at portions of the first transistor Q1 and 10th transistor Q10, it is easily able to concentrate the power consumption at the side of the first transistor Q1 by setting the values of the resistors R21, R1 properly. This arrangement will also be applied to the terminals between 306 and 307, and 308 and 309. Accordingly, with the arrangement of the first transistor Q1 provided on the discharge plate of the thermal fuse 324, it is easy to prevent the occurrence of breakdown and abnormal heating of the charging device.

According to the present invention, as described above, it becomes possible to detect that the battery is short-circuited after the charging voltage characteristic reaches the vicinity of the steady state, and accordingly, the present invention is highly valuable in practical use because an erroneous detection at the transitional period can be prevented.

Moreover, according to the present invention, when the output voltage of the source circuit is lower than the voltage at the battery terminal due to an interruption of supply of power, etc. during the charging, the series transistor is turned off, and therefore the charging device of the present invention is practically useful in that the battery can be prevented from being discharged.

Since it is so arranged according to the present invention that the initial setting signal is not formed until the connection of the battery is detected, all of the connected batteries including one which is connected in a partially charged condition can be charged. Moreover, the charging is automatically started again after the interruption is restored, the charging device of the present invention is useful.

Even when the selected battery terminal is short-circuited in the charging device which has a plurality of batteries to be charged individually and successively one after another, the switching control circuit is driven without fail to start the charging of a succeeding battery. Accordingly, the charging device of the present invention is useful.

Further, according to the present invention, when it takes place that the AC pack and a battery are erroneously connected, the series transistor inserted in the source line is brought into the off-state, and therefore the charging device is never damaged or destroyed.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A battery charging device comprising:
   a constant current source;
   a plurality of battery circuit lines for connecting each of a plurality of batteries, respectively, to the constant current source to be charged thereby;
   a plurality of switch circuits for controlling the supply of current from the constant current source to each of the respective battery circuit lines;
   a full-charge detection means of detecting upon connection to a battery a fully charged state of the battery;
   a short-circuit detection circuit for determining whether a battery is short-circuited by measuring voltage level at a connection terminal of the battery at a selected time after said constant current source is connected thereto;
   a switching control circuit means for switching said battery circuit line switch circuits one after another to successively connect each of said plurality of batteries to said constant current source to be charged, said switching control circuit means operating upon detection of one of a battery fully charged state and a short-circuited battery condition; and
   a source voltage control circuit means for maintaining source voltage of the switching control circuit means when a battery connection terminal is short-circuited, including a series transistor connected in circuit between the constant current source and the battery circuit lines and a circuit including a control transistor connected to the series transistor and a Zener diode connected between the base of the control transistor and the constant current source to control the conducting condition of the series transistor in response to output voltage of the constant current source such that said source voltage control circuit means operates to drive said control transistor to a non-conducting condition to disconnect said constant current source from said battery circuit lines upon a drop in voltage due to connection of a short-circuited battery, said short-circuit detection circuit and said switching control circuit means being connected to said constant current source at a side of said control transistor connected to said constant current source so as to maintain connection of source voltage thereto and sustain operation of said short-circuit detection circuit and said switching control circuit means to disconnect said short-circuited battery from said constant current source and connect another battery to be charged.

2. A battery charging device as defined in claim 1, further including a short-circuit detection prohibiting circuit for prohibiting the switching operation of said switching control circuit, even when it is determined by the short-circuit detection circuit that the battery is in a short-circuited state, until terminal voltage of the battery being charged reaches a near steady state.

3. A battery charging device as defined in claim 1, further including a switch means which is turned on when each battery is connected to the constant current source, a rising detection circuit which detects the rising of an output from said switch means, and a signal forming circuit which forms an initially set signal on the basis of an output generated by said rising detection circuit, the switching control circuit means being set in an initial state by said initially set signal.

4. A battery charging device as defined in claim 1, further including an abnormal-charging condition detection circuit which detects whether a connected battery is charged in an abnormal condition, and a display means which identifies whether the condition of the battery is abnormally charged or fully charged.

5. A battery charging device as defined in claim 1, further including a battery and constant current source detection circuit for turning said series transistor on only when said constant current source is connected at a given position.

6. A battery charging device comprising:
a constant current source;
a plurality of battery circuit lines for connecting each of a plurality of batteries, respectively, to the constant current source to be charged thereby;
a plurality of switch circuits for controlling the supply of current from the constant current source to each of the respective battery circuit lines;
a full-charge detection means for detecting upon connection to a battery a fully charged state of the battery;
a short-circuit detection circuit for determining whether a battery is short-circuited by measuring voltage level at a connection terminal of the battery at a selected time after said constant current source is connected thereto;
an over-discharged battery discrimination means for determining whether a battery is over-discharged on the basis of measurement of an initial voltage of the output of the constant current source immediately after connection of the battery thereto, a charging voltage below a preset threshold being recognized as determining that an over-discharged battery has been connected for charging; and means operated in accordance with said determination for setting a time of connection of said full-charge detection means to said battery to start detection of a fully-charged state of the battery to begin at a time later than a time at which said full-charge detection means is connected for detection of full-charge of a normally discharged battery, such that false detection of a charging condition of said over-discharged battery as a full-charge condition will be prevented; and
a switching control circuit means for switching said battery circuit line switch circuits one after another to successively connect each of said plurality of batteries to said constant current source to be charged, said switching control circuit means operating upon detection of one of a battery fully charged state and a short-circuited battery condition.

7. A battery charging device as defined in claim 6, further including a short-circuit detection prohibiting circuit for prohibiting the switching operation of said switching control circuit, even when it is determined by the short-circuit detection circuit that the battery is in a short-circuited state, until terminal voltage of the battery being charged reaches a near steady state.

8. A battery charging device as defined in claim 6, further including a switch means which is turned on when each battery is connected to the constant current source, a rising detection circuit which detects the rising of an output from said switch means, and a signal forming circuit which forms an initially set signal on the basis of an output generated by said rising detection circuit, the switching control circuit means being set in an initial state by said initially set signal.

9. A battery charging device as defined in claim 6, further including an abnormal-charging condition detection circuit which detects whether a connected battery is charged in an abnormal condition, and a display means which identifies whether the condition, and a display means which identifies whether the condition of the battery is abnormally charged or fully charged.

10. A battery charging device as defined in claim 6 further including a series transistor connected in circuit between the constant current source and the battery circuit lines, and a battery and constant current source detection circuit for turning said series transistor on only when said constant current source is connected at a given position.

11. A battery charging device comprising:
a constant current source;
a plurality of battery circuit lines for connecting each of a plurality of batteries, respectively, to the constant current source to be charged thereby;
a plurality of switch circuits for controlling the supply of current from the constant current source to each of the respective battery circuit lines;
a full-charge detection means for detecting upon connection to a battery a fully charged state of the battery;
a short-circuit detection circuit for determining whether a battery is short-circuited by measuring voltage level at a connection terminal of the battery at a selected time after said constant current source is connected thereto;
a series transistor connected in circuit between the constant current source and the battery circuit lines, and a reverse current detection circuit including a comparison circuit which compares terminal voltage of a battery with output voltage of the constant current source and operates to turn the series transistor to an off state when the terminal voltage of the battery is higher than the output voltage of the constant current source; and
a switching control circuit means for switching said battery circuit line switch circuits one after another to successively connect each of said plurality of batteries to said constant current source to be charged, said switching control circuit means operating upon detection of one of a battery fully charged state and a short-circuited battery condition;
wherein said short-circuit detection circuit includes a first short-circuit detection circuit which detects if the charging voltage reaches a first reference voltage within a first predetermined period of time, and a second short-circuit detection circuit which detects if the charging voltage reaches a second reference voltage, which is higher than said first reference voltage, within a second predetermined period of time which is longer than said first predetermined period of time.

12. A battery charging device comprising:

a constant current source;

a plurality of battery circuit lines for connecting each of a plurality of batteries, respectively, to the constant current source to be charged thereby;

a plurality of switch circuits for controlling the supply of current from the constant current source to each of the respective battery circuit lines;

a full-charge detection means for detecting upon connection to a battery a fully charged state of the battery;

a short-circuit detection circuit for determining whether a battery is short-circuited by measuring voltage level at a connection terminal of the battery at a selected time after said constant current source is connected thereto;

a switching control circuit means for switching said battery circuit line switch circuits one after another to successively connect each of said plurality of batteries to said constant current source to be charged, said switching control circuit means operating upon detection one of a battery fully charged state and a short-circuited battery condition; and a source voltage control circuit means for maintaining source voltage of the switching control circuit means when a battery connection terminal is short-circuited, including a series transistor connected in circuit between the constant current source and the battery circuit lines and a circuit including a control transistor connected to the series transistor and a Zener diode connected between the base of the control transistor and the constant current source to control the conducting condition of the series transistor in response to output voltage of the constant current source;

wherein said short-circuit detection circuit includes a first short-circuit detection circuit which detects if the charging voltage reaches a first reference voltage within a first predetermined period of time, and a second short-circuit detection circuit which detects if the charging voltage reaches a second reference voltage, which is higher than said first reference voltage, within a second predetermined period of time which is longer than said first predetermined period of time.

13. A battery charging device comprising:

a constant current source;

a plurality of battery circuit lines for connecting each of a plurality of batteries, respectively, to the constant current source to be charged thereby;

a plurality of switch circuits for controlling the supply of current from the constant current source to each of the respective battery circuit lines;

a full-charge detection means for detecting upon connection to a battery a fully charged state of the battery;

a short-circuit detection circuit for determining whether a battery is short-circuited by measuring voltage level at a connection terminal of the battery at a selected time after said constant current source is connected thereto;

an over-discharged battery discrimination means for determining whether a battery is over-discharged on the basis of measurement of an initial voltage of the output of the constant current source immediately after connection of the battery thereto, and means operated in accordance with said determination for setting a time of connection of said full-charge detection means to said battery to start detection of a fully-charged state of the battery; and a switching control circuit means for switching said battery circuit line switch circuits one after another to successively connect each of said plurality of batteries to said constant current source to be charged, said switching control circuit means operating upon detection of one of a battery fully charged state and a short-circuited battery condition;

wherein said short-circuit detection circuit includes a first short-circuit detection circuit which detects if the charging voltage reaches a first reference voltage within a first predetermined period of time, and a second short-circuit detection circuit which detects if the charging voltage reaches a second reference voltage, which is higher than said first reference voltage, within a second predetermined period of time which is long than said first predetermined period of time.

* * * * *